(12) United States Patent
Lee et al.

(10) Patent No.: US 12,250,642 B2
(45) Date of Patent: Mar. 11, 2025

(54) METHOD AND DEVICE FOR DETERMINING SIDELINK TRANSMIT POWER IN NR V2X

(71) Applicant: LG Electronics Inc., Seoul (KR)

(72) Inventors: Seungmin Lee, Seoul (KR); Hanbyul Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 364 days.

(21) Appl. No.: 17/602,502

(22) PCT Filed: Apr. 9, 2020

(86) PCT No.: PCT/KR2020/004851
§ 371 (c)(1),
(2) Date: Oct. 8, 2021

(87) PCT Pub. No.: WO2020/209642
PCT Pub. Date: Oct. 15, 2020

(65) Prior Publication Data
US 2022/0217649 A1    Jul. 7, 2022

Related U.S. Application Data

(60) Provisional application No. 62/831,712, filed on Apr. 9, 2019.

(30) Foreign Application Priority Data

Oct. 18, 2019    (KR) ........................ 10-2019-0130222

(51) Int. Cl.
*H04W 52/24*    (2009.01)
*H04W 4/40*    (2018.01)
*H04W 52/36*    (2009.01)

(52) U.S. Cl.
CPC ........... *H04W 52/242* (2013.01); *H04W 4/40* (2018.02); *H04W 52/36* (2013.01)

(58) Field of Classification Search
CPC ... H04W 4/40; H04W 52/225; H04W 52/242; H04W 52/243; H04W 52/36; H04W 52/367; H04W 52/383; H04W 92/18
See application file for complete search history.

(56) References Cited

U.S. PATENT DOCUMENTS 9,480,026 B2   10/2016   Kwak et al.
2021/0022091 A1 *   1/2021   Li ........................ H04W 52/242
(Continued)

FOREIGN PATENT DOCUMENTS

KR    10-2016-0144984    12/2016

OTHER PUBLICATIONS

LG Electronics, "Discussion on physical layer procedure for NR V2X," R1-1901931, Presented at 3GPP TSG RAN WG1 Meeting #96, Athens, Greece, Feb. 25-Mar. 1, 2019, 12 pages.

(Continued)

*Primary Examiner* — Nguyen T Vo
(74) *Attorney, Agent, or Firm* — Fish & Richardson P.C.

(57) ABSTRACT

Provided are a method for a first device carrying out wireless communication, and a device supporting same. The method may comprise the steps of: receiving information related to a first power control parameter; receiving information related to a second power control parameter; determining a first transmit power value on the basis of downlink (DL) path loss between a base station and a first device, and the information related to the first power control parameter; determining a second transmit power value on the basis of sidelink (SL) path loss between a second device and the first device, and the information related to the second power control parameter; determining a transmit power value on (Continued)

the basis of the minimum value among the first transmit power value and the second transmit power value; and carrying out SL transmission to the second device on the basis of the transmit power value.

20 Claims, 23 Drawing Sheets

(56) References Cited

U.S. PATENT DOCUMENTS

| | | | |
|---|---|---|---|
| 2021/0410084 A1* | 12/2021 | Li | H04W 52/265 |
| 2022/0078721 A1* | 3/2022 | Xue | H04W 52/146 |
| 2022/0086768 A1* | 3/2022 | Yeo | H04W 52/242 |

OTHER PUBLICATIONS

Samsung, "On Physical Layer Procedures for NR V2X," R1-1901048, Presented at 3GPP TSG RAN WG1 Ad-Hoc Meeting 1901, Taipei, Taiwan, Jan. 21-25, 2019, 11 pages.

Spreadtrum Communications, "Discussion on NR sidelink physical layer procedure," R1-1900714, Presented at 3GPP TSG RAN WG1 Ad-Hoc Meeting 1901, Taipei, Jan. 21-25, 2019, 6 pages.

* cited by examiner

FIG. 4
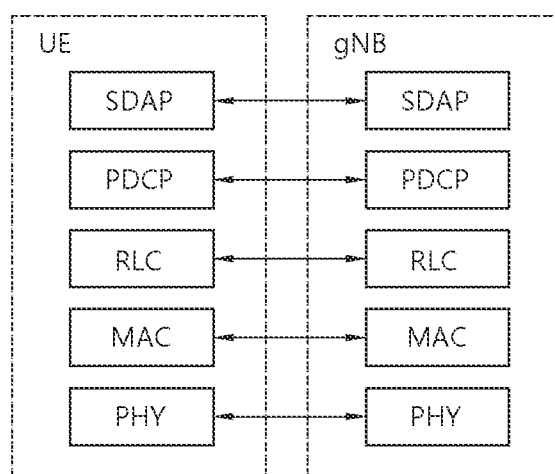
(a)
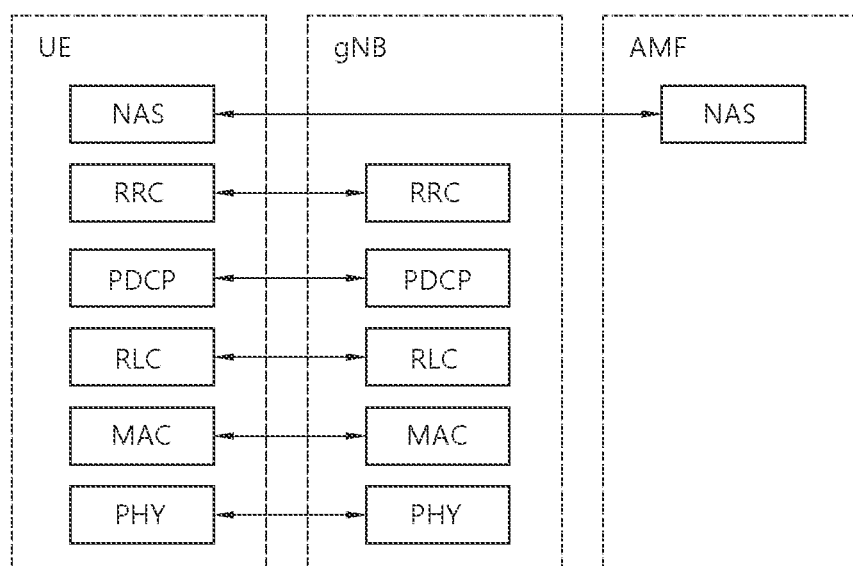
(b)

FIG. 8
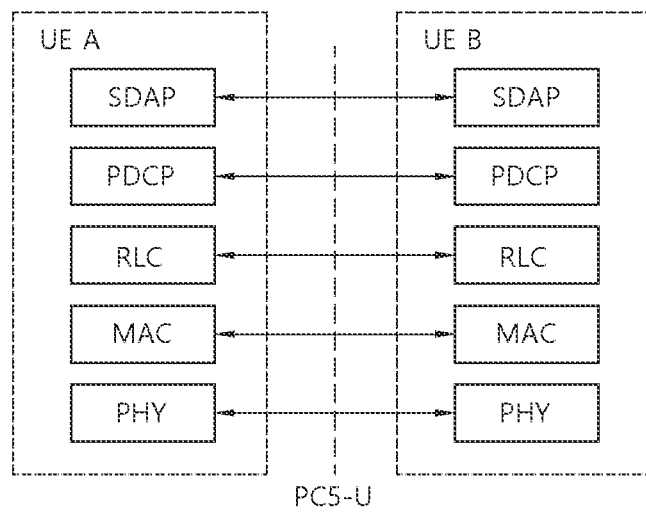
(a)
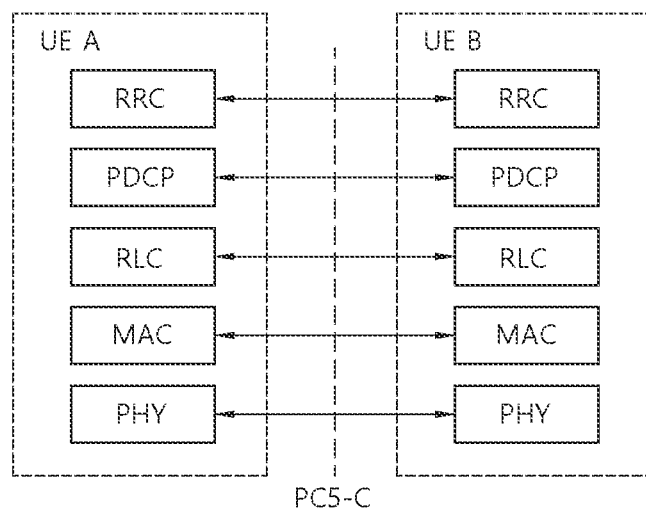
(b)

METHOD AND DEVICE FOR DETERMINING SIDELINK TRANSMIT POWER IN NR V2X

CROSS-REFERENCE TO RELATED APPLICATIONS

This application is a National Stage application under 35 U.S.C. § 371 of International Application No. PCT/KR2020/004851, filed on Apr. 9, 2020, which claims the benefit of U.S. Provisional Application No. 62/831,712, filed on Apr. 9, 2019 and Korean Patent Application No. 10-2019-0130222, filed on Oct. 18, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in SL communication, the UE needs to control transmit power for SL transmission.

Technical Solutions

In one embodiment, a method for performing wireless communication by a first device is provided. The method may comprise: receiving information related to a first power control parameter; receiving information related to a second power control parameter; determining a first transmit power value based on the information related to the first power control parameter and a downlink (DL) pathloss between a base station and the first device; determining a second transmit power value based on the information related to the second power control parameter and a sidelink (SL) pathloss between the first device and a second device; determining a transmit power value based on a minimum value among the first transmit power value and the second transmit power value; and performing, to the second device, SL transmission based on the transmit power value.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive information related to a first power control parameter; receive information related to a second power control parameter; determine a first transmit power value based on the information related to the first power control parameter and a downlink (DL) pathloss between a base station and the first device; determine a second transmit power value based on the information related to the second power control parameter and a sidelink (SL) pathloss between the first device and a second device; determine a transmit power value based on a minimum value among the first transmit power value and the second transmit power value; and perform, to the second device, SL transmission based on the transmit power value.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
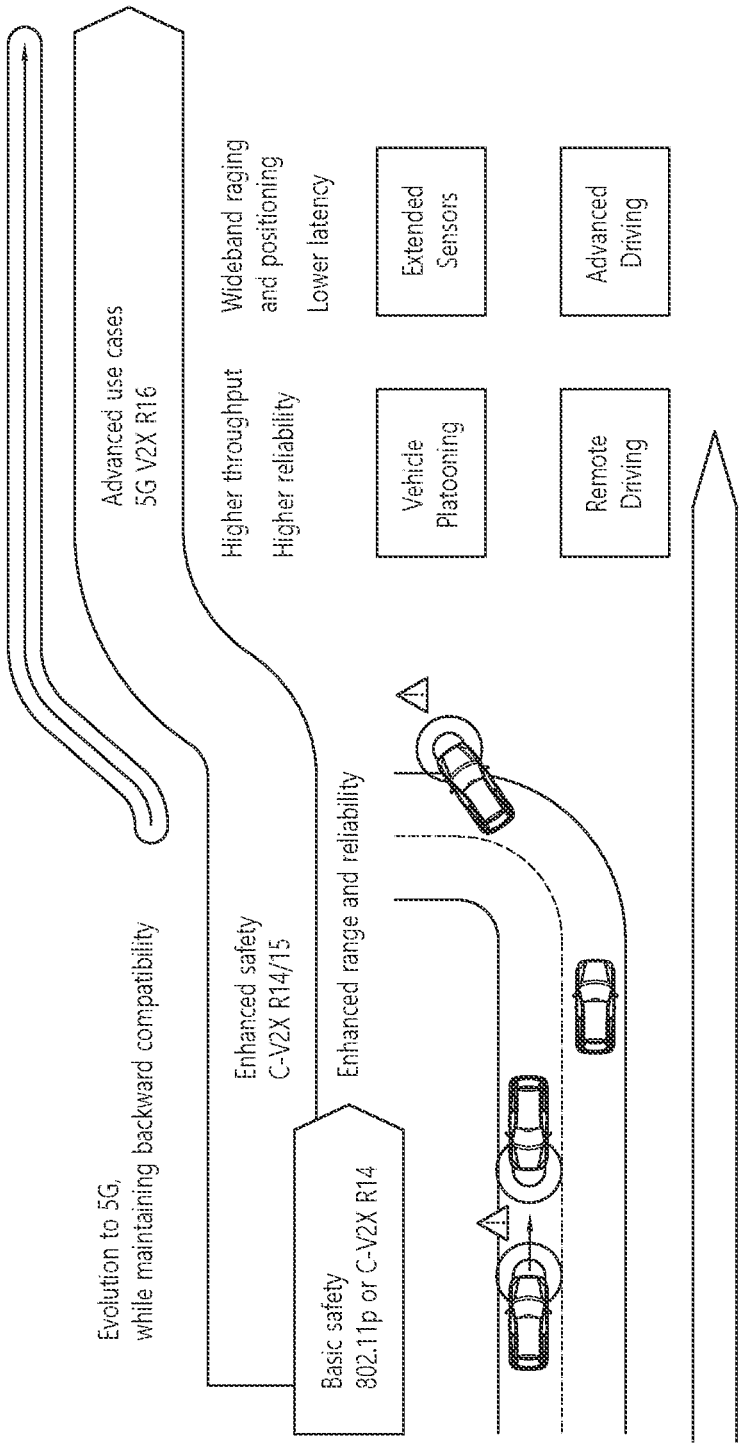
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
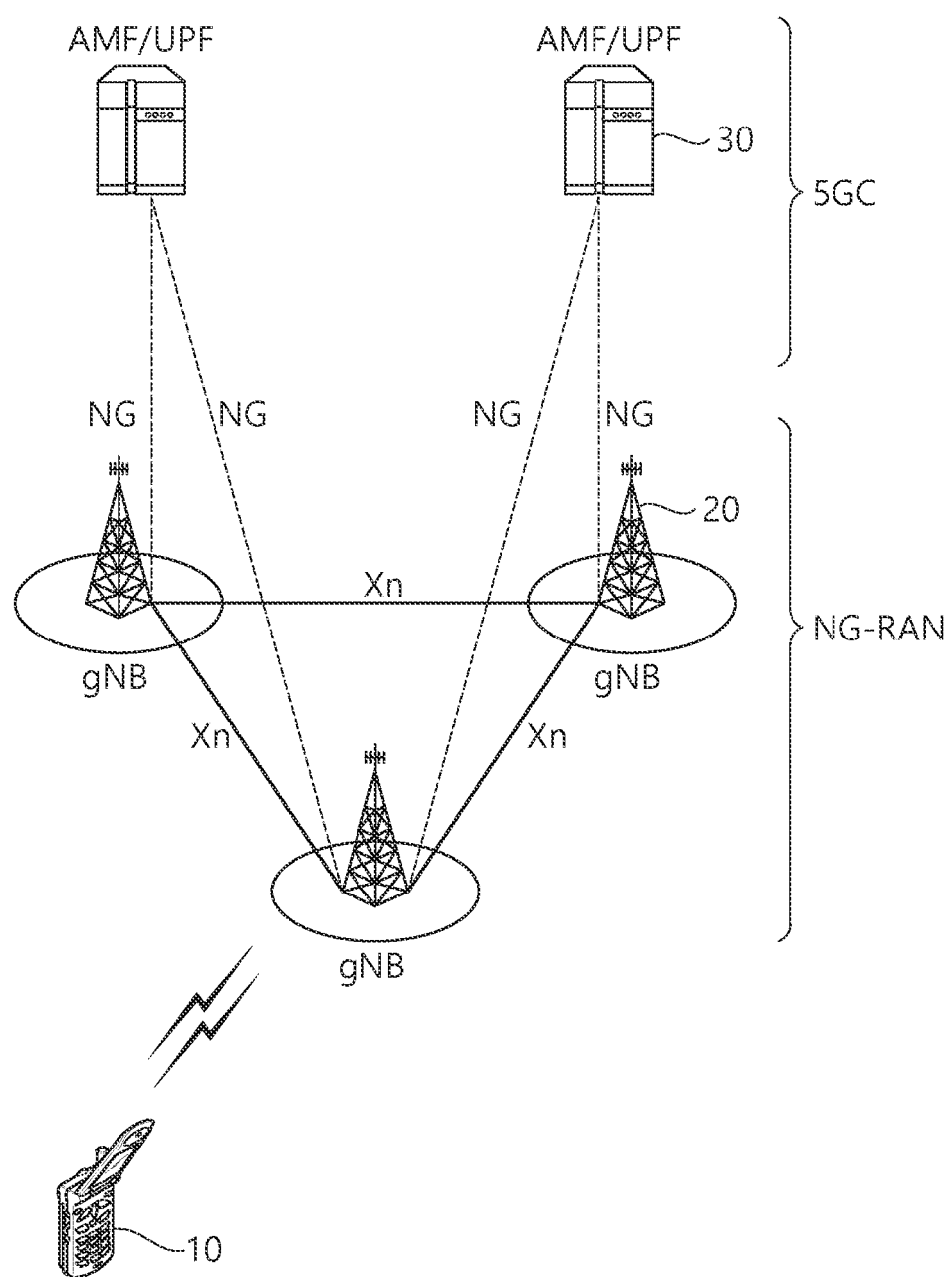
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
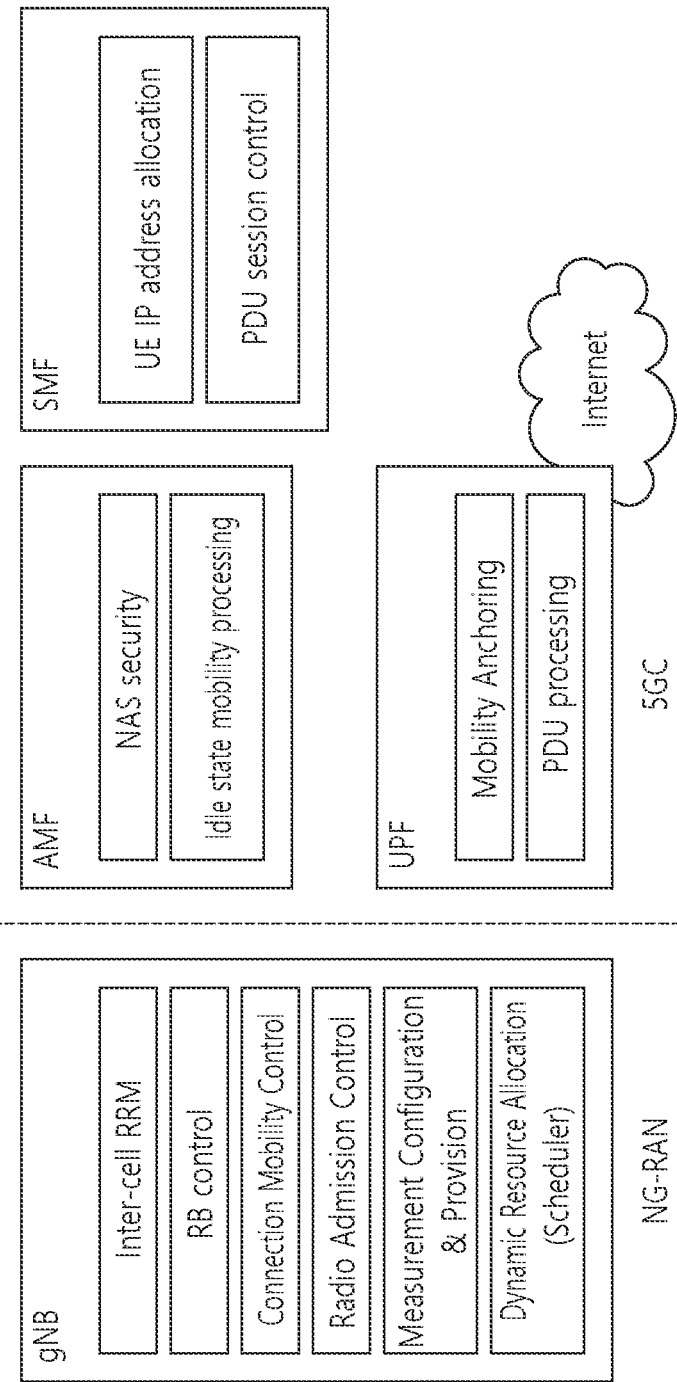
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. AUPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
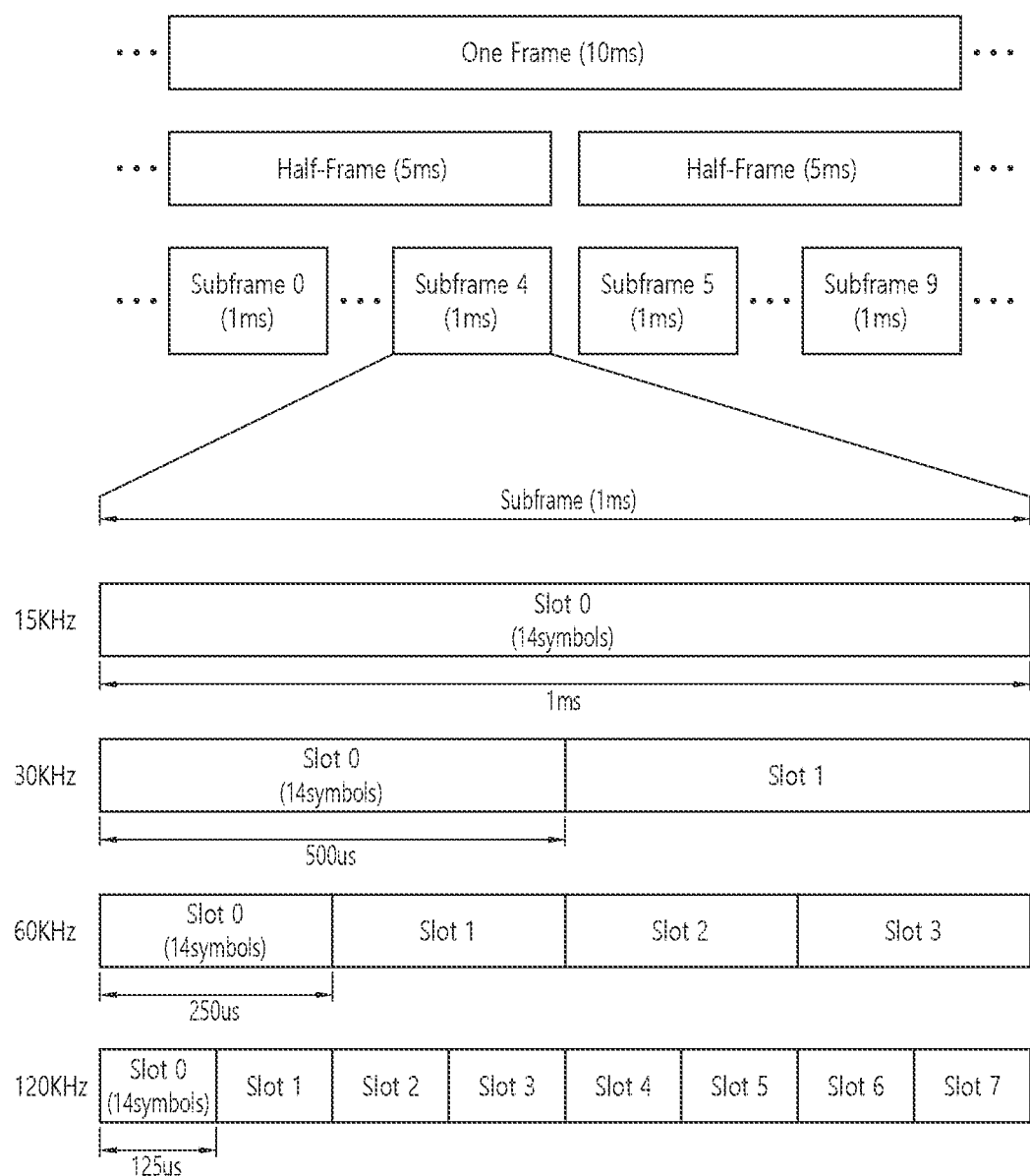
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
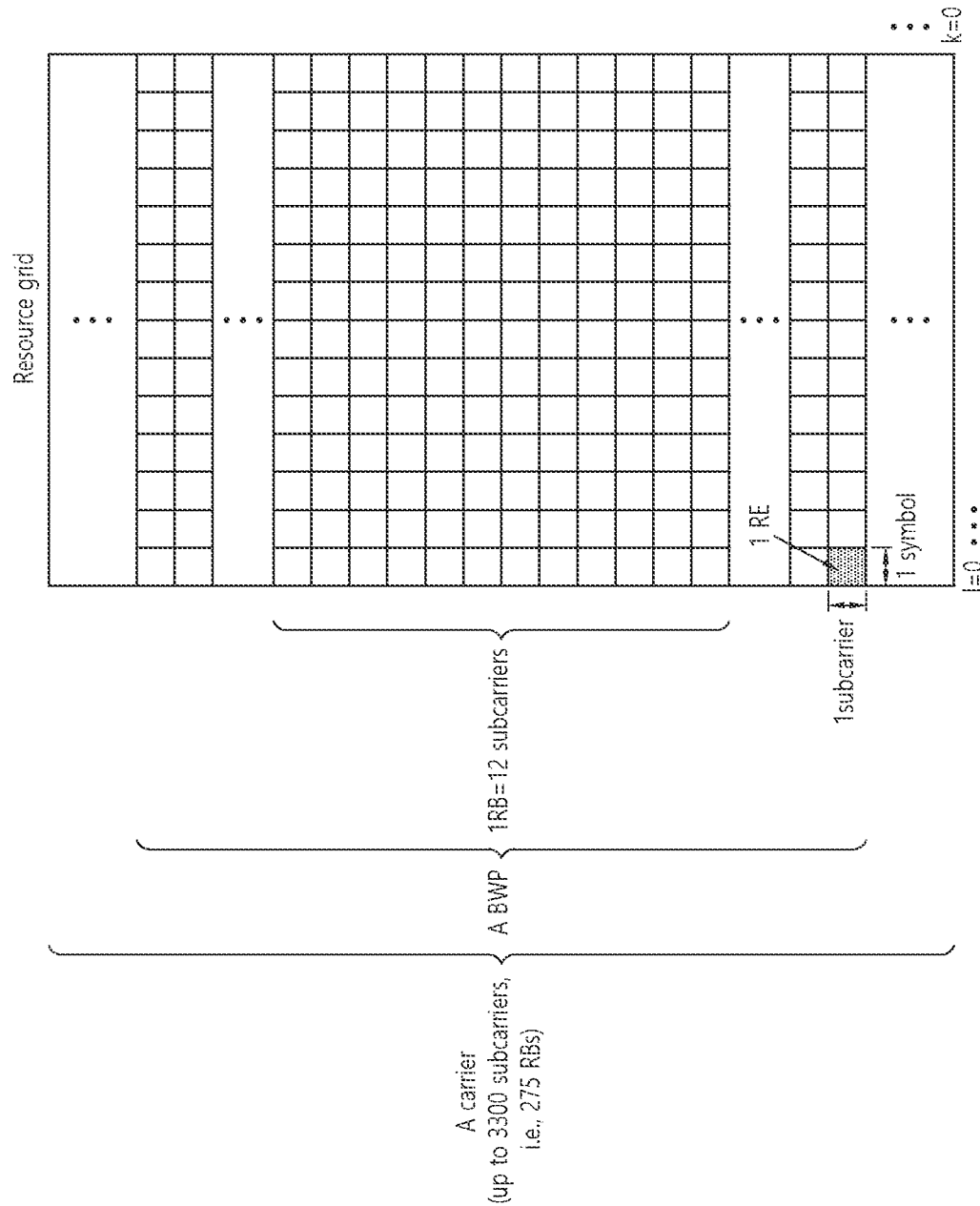
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
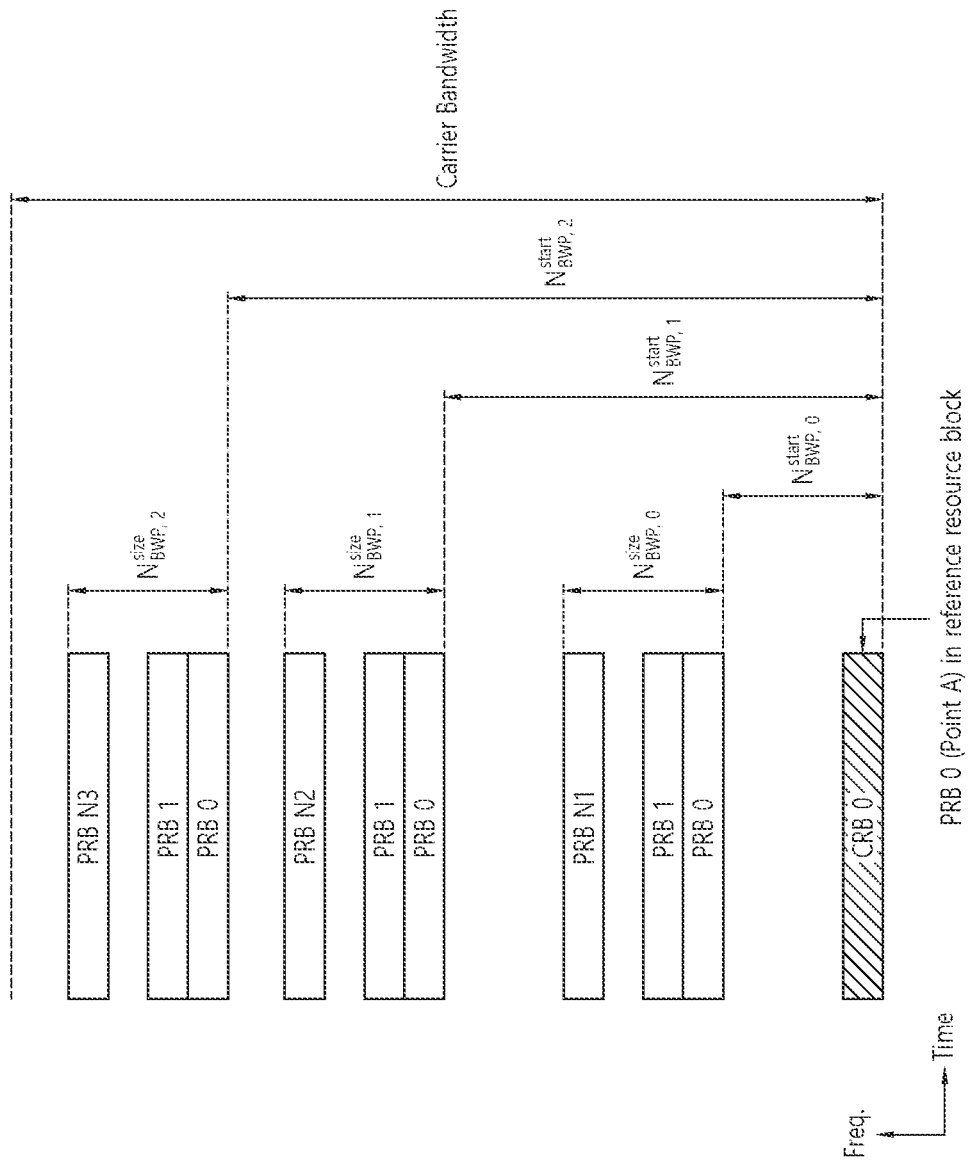
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
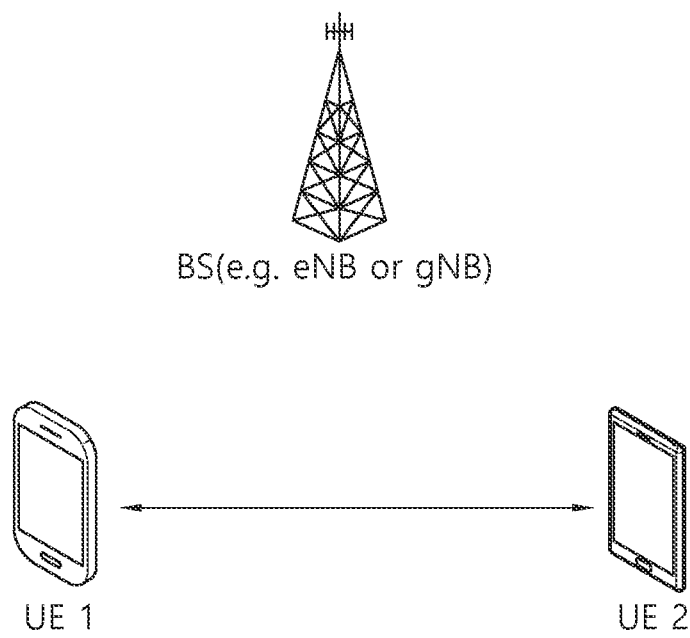
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
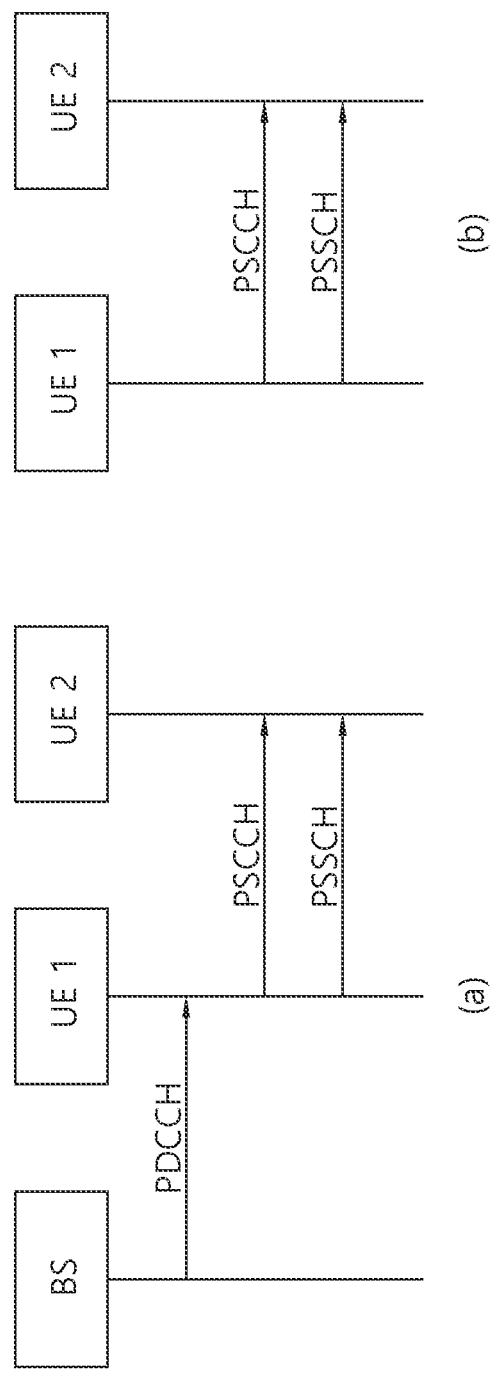
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
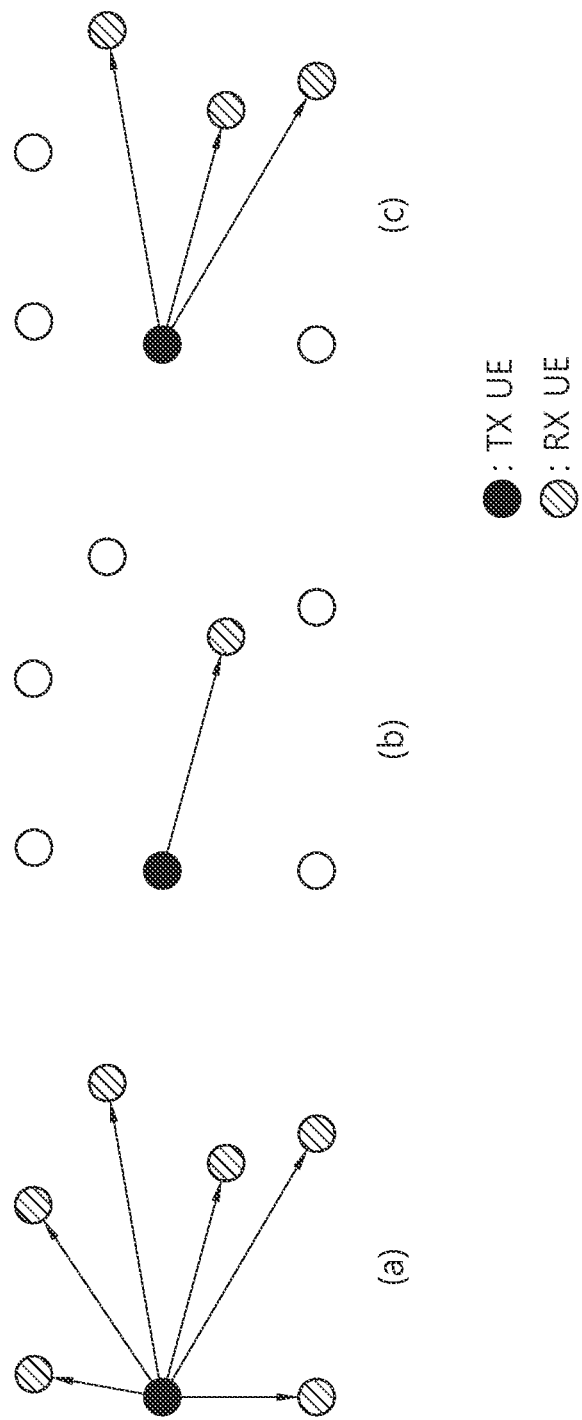
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
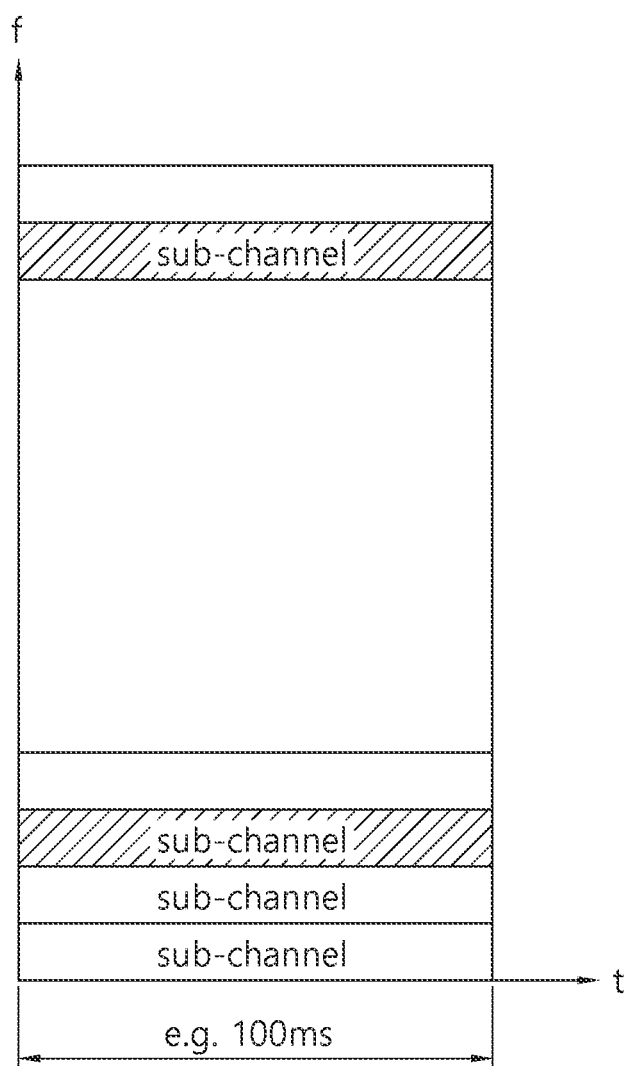
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, power control will be described.

A method in which a UE controls uplink transmit power thereof may include open loop power control (OLPC) and closed loop power control (CLPC). Based on the OLPC, the UE may estimate a downlink pathloss from a BS of a cell to which the UE belongs, and the UE may perform power control in such a manner that the pathloss is compensated for. For example, based on the OLPC, if a distance between the UE and the BS further increases and thus a downlink pathloss increases, the UE may control uplink power in such a manner that uplink transmit power is further increased. Based on the CLPC, the UE may receive information (e.g., a control signal) required to adjust uplink transmit power from the BS, and the UE may control uplink power based on the information received from the BS. That is, based on the CLPC, the UE may control the uplink power based on a direct power control command received from the BS.

The OLPC may be supported in SL. Specifically, when the transmitting UE is inside the coverage of the BS, the BS may enable OPLC for unicast, groupcast, and broadcast transmission based on the pathloss between the transmitting UE and a serving BS of the transmitting UE. If the transmitting UE receives information/configuration for enabling the OLPC from the BS, the transmitting UE may enable OLPC for unicast, groupcast, or broadcast transmission. This may be to mitigate interference for uplink reception of the BS.

Additionally, at least in case of unicast, a configuration may be enabled to use the pathloss between the transmitting UE and the receiving UE. For example, the configuration may be pre-configured for the UE. The receiving UE may report an SL channel measurement result (e.g., SL RSRP) to the transmitting UE, and the transmitting UE may derive pathloss estimation from the SL channel measurement result reported by the receiving UE. For example, in SL, if the transmitting UE transmits a reference signal to the receiving UE, the receiving UE may estimate a channel between the transmitting UE and the receiving UE based on the reference signal transmitted by the transmitting UE. In addition, the receiving UE may transmit the SL channel measurement result to the transmitting UE. In addition, the transmitting UE may estimate the SL pathloss from the receiving UE based on the SL channel measurement result. In addition, the transmitting UE may perform SL power control by compensating for the estimated pathloss, and may perform SL transmission for the receiving UE. Based on the OLPC in SL, for example, if a distance between the transmitting UE and the receiving UE further increases and thus the SL pathloss increases, the transmitting UE may control SL transmit power in such a manner that the SL transmit power is further increased. The power control may be applied in SL physical channel (e.g., PSCCH, PSSCH, physical sidelink feedback channel (PSFCH)) and/or SL signal transmission.

In order to support the OLPC, at least in case of unicast, long-term measurement (e.g., L3 filtering) may be supported on SL.

For example, total SL transmit power may be identical in symbols used for PSCCH and/or PSSCH transmission in a slot. For example, maximum SL transmit power may be configured for the transmitting UE or may be pre-configured.

For example, in case of the SL OLPC, the transmitting UE may be configured to use only a downlink pathloss (e.g., a pathloss between the transmitting UE and the BS). For example, in case of the SL OLPC, the transmitting UE may be configured to use only an SL pathloss (e.g., a pathloss between the transmitting UE and the receiving UE). For example, in case of the SL OLPC, the transmitting UE may be configured to use a downlink pathloss and the SL pathloss.

For example, if the SL OLPC is configured to use both the downlink pathloss and the SL pathloss, the transmitting UE may determine a minimum value as transmit power among power obtained based on the downlink pathloss and power obtained based on the SL pathloss. For example, P0 and an alpha value may be configured separately for the downlink pathloss and the SL pathloss or may be pre-configured. For example, P0 may be a user-specific parameter related to signal to interference plus noise ratio (SINR) received on average. For example, the alpha value may be a weight value for the pathloss.

In various embodiments of the present disclosure, a transmitting UE (i.e., TX UE) may be a UE which transmits data to (target) receiving UE(s) (i.e., RX UE(s)). For example, the TX UE may be a UE which performs PSCCH transmission and/or PSSCH transmission. Additionally/alternatively, for example, the TX UE may be a UE which transmits SL CSI-RS(s) and/or a SL CSI report request indication to (target) RX UE(s). Additionally/alternatively, for example, the TX UE may be a UE transmitting a (control) channel (e.g., PSCCH, PSSCH, etc.) and/or reference signal(s) (e.g., DM-RS(s), CSI-RS(s), etc.) through the (control) channel, which may be used for SL RLM operation(s) and/or SL RLF operation(s) of the (target) RX UE(s).

In various embodiments of the present disclosure, a receiving UE (i.e., RX UE) may be a UE which transmits SL HARQ feedback to transmitting UE(s) (i.e., TX UE(s)), based on whether or not data transmitted by TX UE(s) is decoded successfully and/or whether or not a PSCCH (related to PSSCH scheduling) transmitted by TX UE(s) is detected/decoded successfully. Additionally/alternatively, for example, the RX UE may be a UE which performs SL CSI transmission to TX UE(s) based on SL CSI-RS(s) and/or a SL CSI report request indication received from TX UE(s). Additionally/alternatively, for example, the RX UE may be a UE which transmits, to TX UE(s), an SL (L1) RSRP measurement value measured based on (pre-defined) reference signal(s) and/or SL (L1) RSRP report request indication received from TX UE(s). Additionally/alternatively, for example, the RX UE may be a UE which transmits its own data to TX UE(s). Additionally/alternatively, for example, the RX UE may be a UE which performs SL RLM operation(s) and/or SL RLF operation(s) based on a (pre-configured) (control) channel and/or reference signal(s) through the (control) channel received from TX UE(s).

In various embodiments of the present disclosure, "configuration" or "definition" may mean (pre-)configuration from base station(s) or network(s). For example, "configuration" or "definition" may mean resource pool specific (pre-)configuration from base station(s) or network(s). For example, base station(s) or network(s) may transmit information related to "configuration" or "definition" to UE(s). For example, base station(s) or network(s) may transmit information related to "configuration" or "definition" to UE(s) through pre-defined signaling. For example, the pre-defined signaling may include at least one of RRC signaling, MAC signaling, PHY signaling, and/or SIB.

In various embodiments of the present disclosure, a resource block (RB) may be replaced with a subcarrier, or vice versa.

In various embodiments of the present disclosure, a channel may be replaced with a signal, or vice versa.

In various embodiments of the present disclosure, a cast type may be replaced with at least one of unicast, groupcast, and/or broadcast, or vice versa.

In various embodiments of the present disclosure, a time may be replaced with a frequency from a resource point of view, or vice versa. For example, time resource(s) may be replaced with frequency resource(s), or vice versa.

In various embodiments of the present disclosure, a (physical) channel used when the RX UE transmits at least one of SL HARQ feedback, SL CSI, and/or SL (L1) RSRP to the TX UE may be referred to as a PSFCH.

Figure 13:
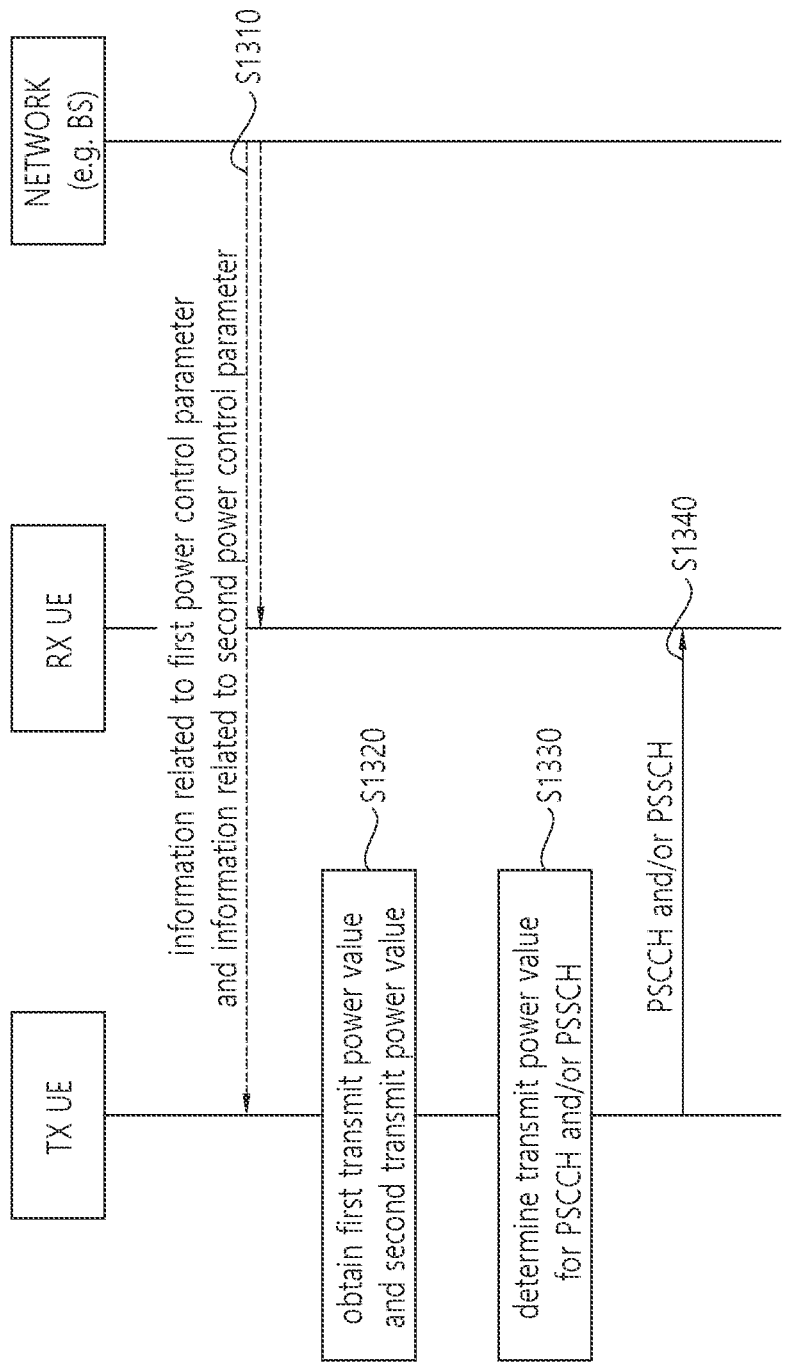
FIG. 13 shows a procedure in which a UE performs SL transmission based on power control, based on an embodiment of the present disclosure.

FIG. 13 shows a procedure in which a UE performs SL transmission based on power control, based on an embodiment of the present disclosure. The embodiment of FIG. 13 may be combined with various embodiments of the present disclosure.

Referring to FIG. 13, in step S1310, a network may transmit information related to first power control parameter(s) and information related to second power control parameter(s). For example, the network may configure or pre-configure information related to first power control parameter(s) and information related to second power control parameter(s) to one or more UEs within the coverage of the network. For example, information related to first power control parameter(s) and information related to second power control parameter(s) may be configured independently for the UE. For example, information related to first power control parameter(s) and information related to second power control parameter(s) may be configured differently for the UE. For example, the network may transmit information related to first power control parameter(s) and information related to second power control parameter(s) to the TX UE. For example, the network may transmit information related to first power control parameter(s) and information related to second power control parameter(s) to the RX UE. For example, the network may be a base station.

For example, information related to first power control parameter(s) may be information used by the TX UE to obtain a first transmit power value related to a DL pathloss. For example, the DL pathloss may be a pathloss between the TX UE and the base station. For example, first power control parameter(s) may include OLPC-related parameter(s). For example, first power control parameter(s) may include at least one of a PO_DL value and/or an ALPHA_DL value. For example, first power control parameter(s) may include at least one of a PO_DL value, an ALPHA_DL value, and/or a PCMAX_DL value. For example, the PO_DL value may be a user-specific parameter related to an average of (or maximum or minimum among) received SINRs related to UL communication, or a user-specific parameter related to an average of (or maximum or minimum among) SL interference levels to UL communication. For example, when the TX UE performs UL transmission to the base station, from the base station point of view, the PO_DL value may be a transmit power control parameter value for achieving a minimum required (or averagely required) (target/reception) performance (e.g., SNR). For example, when the TX UE performs SL transmission, from the base station point of view, the PO_DL value may a (maximum or minimum or average) SL interference level control parameter value that can be allowed to achieve the minimum (or average) (target/reception) required performance of UL communication. For example, when the TX UE performs UL transmission to the base station without applying CLPC related to UL communication, from the base station point of view, the PO_DL value may be a transmit power control parameter value for achieving a minimum required (or averagely required) (target/reception) performance (e.g., SNR). For example, when the TX UE performs SL transmission without applying CLPC related to SL communication, from the base station point of view, the PO_DL value may a (maximum or minimum or average) SL interference level control parameter value that can be allowed to achieve the minimum (or average) (target/reception) required performance of UL communication. For example, the ALPHA_DL value may be a weight value for the DL pathloss. For example, when the TX UE performs UL transmission to the base station, from the base station point of view, the ALPHA_DL value may be a transmit power control parameter value for ensuring the same (average or minimum or maximum) reception power regardless of the distance between the base station and the TX UE. For example, when the TX UE performs SL transmission, from the base station point of view, the ALPHA_DL value may be a transmit power control parameter value for ensuring the same (average or minimum or maximum) SL interference level/power regardless of the distance between the base station and the TX UE. For example, when the TX UE performs UL transmission to the base station, from the base station point of view, the ALPHA_DL value may be a transmit power control parameter value for ensuring (average or minimum or maximum) (target/reception) performance regardless of the distance between the base station and the TX UE. For example, when the TX UE performs UL transmission to the base station, the PCMAX_DL value may be a maximum (UL) transmit power value available or allowable for the TX UE. For example, when the TX UE performs SL transmission, the PCMAX_DL value may be a maximum (or minimum or average) allowable SL interference level/power value that can affect UL communication. For example, when the TX UE performs UL transmission to the base station, the PCMAX_DL value may be a maximum (UL) transmit power value available or allowable for the TX UE for a specific carrier or a specific cell. For example, when the TX UE performs SL transmission, the PCMAX_DL value may be a maximum (or minimum or average) allowable SL interference level/power value that can affect UL communication on a specific carrier or a specific cell. For example, the PO_DL value may be referred to as a p0-DL-PSCCHPSSCH value or a dl-P0-PSSCH-PSCCH value. For example, the ALPHA_DL value may be referred to as an alpha-DL-PSCCHPSSCH value or a dl-Alpha-PSSCH-PSCCH value. For example, the PCMAX_DL value may be referred to as PCMAX.

For example, information related to second power control parameter(s) may be information used by the TX UE to obtain a second transmit power value related to a SL pathloss. For example, the SL pathloss may be a pathloss between the TX UE and the RX UE. For example, second power control parameter(s) may include OLPC-related parameter(s). For example, second power control parameter(s) may include at least one of a PO_SL value and/or an ALPHA_SL value. For example, second power control parameter(s) may include at least one of a PO_SL value, an ALPHA_SL value, and/or a PCMAX_SL value. For example, the PO_SL value may be a user-specific parameter related to an average of (or maximum or minimum among) received SINRs related to SL communication. For example, when the TX UE performs SL transmission to the RX UE, from the RX UE point of view, the PO_SL value may be a transmit power control parameter value for achieving a minimum required (or averagely required) (target/reception) performance (e.g., SNR). For example, when the TX UE performs SL transmission to the RX UE without applying CLPC related to SL communication, from the RX UE point of view, the PO_SL value may be a transmit power control parameter value for achieving a minimum required (or averagely required) (target/reception) performance (e.g., SNR). For example, the ALPHA_SL value may be a weight value for the SL pathloss. For example, when the TX UE performs SL transmission to the RX UE, from the RX UE point of view, the ALPHA_SL value may be a transmit power control parameter value for ensuring the same (average or minimum or maximum) reception power regardless of the distance between the TX UE and the RX UE. For example, when the TX UE performs SL transmission to the RX UE, from the RX UE point of view, the ALPHA_SL value may be a transmit power control parameter value for ensuring (average or minimum or maximum) (target/reception) performance regardless of the distance between the TX UE and the RX UE. For example, when the TX UE performs SL transmission to the RX UE, the PCMAX_SL value may be a maximum (SL) transmit power value available or allowable for the TX UE. For example, when the TX UE performs SL transmission to the RX UE, the PCMAX_SL value may be a maximum (SL) transmit power value available or allowable for the TX UE for a specific carrier or a specific cell. For example, the PO_SL value may be referred to as a p0-SL-PSCCHPSSCH or a sl-P0-PSSCH-PSCCH value. For example, the ALPHA_SL value may be referred to as an alpha-SL-PSCCHPSSCH value or a sl-Alpha-PSSCH-PSCCH value. For example, the PCMAX_SL value may be referred to as PCMAX.

For example, the PO_DL value (and/or the ALPHA_DL value and/or the PCMAX_DL value) may be configured differently from (or independently of) the PO_SL value (and/or the ALPHA_SL value and/or the PCMAX_SL value).

Additionally, the network may transmit information related to a maximum SL transmit power value to the TX UE. For example, the network may transmit information related to the maximum SL transmit power value to the TX UE through pre-defined signaling. For example, the pre-defined signaling may be SIB or RRC signaling. For example, the maximum SL transmit power value may be the maximum value of SL transmit power that the TX UE can use on a resource pool performing SL communication. For example, the maximum SL transmit power value may be the maximum value of SL transmit power allowed for a resource pool in which the TX UE performs SL communication. For example, the information related to the maximum SL transmit power value may be referred to as sl-MaxTransPower or maximumtransmitPower-SL. For example, the network may be a base station. For example, the maximum SL transmit power value may be configured for the TX UE differently for each congestion level. For example, the maximum SL transmit power value may be configured for the TX UE differently for each SL (channel) quality. For example, the SL (channel) quality may include at least one of SL CSI, SL RSRP, SL RSRQ, and/or SL RSSI. For example, the maximum SL transmit power value may be configured for the TX UE differently for each service type. For example, the maximum SL transmit power value may be configured for the TX UE differently for each service priority. For example, the maximum SL transmit power value may be configured for the TX UE differently for each service-related QoS parameter. For example, the maximum SL transmit power value may be configured for the TX UE differently for each service-related QoS requirement. For example, the service-related QoS requirement may include at least one of reliability, priority, and/or latency. For example, the maximum SL transmit power value may be configured for the TX UE differently for each cast type. For example, the cast type may include at least one of unicast, groupcast, and/or broadcast. For example, the maximum SL transmit power value may be configured for the TX UE differently for each numerology. For example, the numerology may include at least one of subcarrier spacing and/or CP length. For example, the maximum SL transmit power value may be configured for the TX UE differently for each carrier. For example, the maximum SL transmit power value may be configured for the TX UE differently for each resource pool.

In step S1320, the TX UE may obtain or determine a first transmit power value related to the DL pathloss and/or a second transmit power value related to the SL pathloss.

For example, the TX UE may obtain the first transmit power value related to the DL pathloss, by using information related to first power control parameter(s). For example, the TX UE may obtain the first transmit power value based on information related to first power control parameter(s) and the DL pathloss. For example, if information related to first power control parameter(s) includes PO_DL, the TX UE may obtain the first transmit power value based on Equation 1.

$$P\_DL = PO\_DL + 10 \log 10(2^u \cdot M\_RB) + ALPHA\_DL \cdot PL\_DL [dBm] \quad \text{[Equation 1]}$$

Herein, P_DL may be the first transmit power value. For example, P_DL may be a transmit power value for PSSCH. For example, PO_DL may be a value for power control based on the DL pathloss for PSCCH/PSSCH. For example, u may be a value related to SCS configuration. For example, M_RB may be the number of resource blocks for a PSSCH transmission occasion. For example, ALPHA_DL may be a value for power control based on the DL pathloss for PSCCH/PSSCH. For example, if information related to first power control parameter(s) does not include ALPHA_DL, the TX UE may determine that ALPHA_DL is 1. For example, PL_DL may be a pathloss value between the TX UE and the base station.

For example, if the base station does not provide the PO_DL value to the TX UE, and the base station provides the PO_SL value to the TX UE, the TX UE may obtain the first transmit power value based on Equation 2.

$$P\_DL = \min(PCMAX, PMAX\_CBR, P\_SL)[dBm] \quad \text{[Equation 2]}$$

Herein, P_DL may be the first transmit power value. For example, P_DL may be a transmit power value for PSSCH. For example, PCMAX may be a maximum transmit power value of the TX UE. For example, PMAX_CBR may be a value determined by a maximum SL transmit power value of the UE based on a priority level of PSSCH transmission and the CBR range including the CBR measured in one or more slots. For example, P_SL may be a value obtained by Equation 4 described below. For example, y=min (a, b, c) may be a function deriving a minimum value among a, b, and c.

For example, if the base station does not provide the PO_DL value and the PO_SL value to the TX UE, the TX UE may obtain the first transmit power value based on Equation 3.

$$P\_DL = \min(PCMAX, PMAX\_CBR)[dBm] \quad \text{[Equation 3]}$$

Herein, P_DL may be the first transmit power value. For example, P_DL may be a transmit power value for PSSCH. For example, PCMAX may be a maximum transmit power value of the TX UE. For example, PMAX_CBR may be a value determined by a maximum SL transmit power value of the UE based on a priority level of PSSCH transmission and the CBR range including the CBR measured in one or more slots. For example, y=min (a, b) may be a function deriving a minimum value among a and b.

For example, the TX UE may obtain the second transmit power value related to the SL pathloss, by using information related to second power control parameter(s). For example, the TX UE may obtain the second transmit power value based on information related to second power control parameter(s) and the SL pathloss. For example, if information related to second power control parameter(s) includes PO_SL, the TX UE may obtain the second transmit power value based on Equation 4.

$$P\_SL = PO\_SL + 10 \log 10(2^u \cdot M\_RB) + ALPHA\_SL \cdot PL\_SL [dBm] \quad \text{[Equation 4]}$$

Herein, P_SL may be the second transmit power value. For example, P_SL may be a transmit power value for PSSCH. For example, PO_SL may be a value for power control based on the SL pathloss for PSCCH/PSSCH. For example, u may be a value related to SCS configuration. For example, M_RB may be the number of resource blocks for a PSSCH transmission occasion. For example, ALPHA_SL may be a value for SL pathloss-based power control for PSCCH/PSSCH. For example, if information related to second power control parameter(s) does not include ALPHA_SL, the TX UE may determine that ALPHA_SL is 1. For example, PL_SL may be a pathloss value between the TX UE and the RX UE.

For example, when the TX UE obtains/calculates the first transmit power value and the second transmit power value, the TX UE may be configured to use the same number of (scheduled) RBs used for PSSCH transmission and/or PSCCH transmission. For example, the TX UE may obtain the first transmit power value and the second transmit power value by using the same number of (scheduled) RBs used for PSSCH transmission and/or PSCCH transmission.

For example, first power control parameter(s) and/or second power control parameter(s) may be configured differently for the TX UE for each congestion level. For example, first power control parameter(s) and/or second power control parameter(s) may be configured differently for the TX UE for each SL (channel) quality. For example, the SL (channel) quality may include at least one of SL CSI, SL RSRP, SL RSRQ, and/or SL RSSI. For example, first power control parameter(s) and/or second power control parameter(s) may be configured differently for the TX UE for each service type. For example, first power control parameter(s) and/or second power control parameter(s) may be configured differently for the TX UE for each service priority. For example, first power control parameter(s) and/or second power control parameter(s) may be configured differently for the TX UE for each service-related QoS parameter. For example, first power control parameter(s) and/or second power control parameter(s) may be configured differently for the TX UE for each service-related QoS requirement. For example, the service-related QoS requirement may include at least one of reliability, priority, and/or latency. For example, first power control parameter(s) and/or second power control parameter(s) may be configured differently for the TX UE for each cast type. For example, the cast type may include at least one of unicast, groupcast, and/or broadcast. For example, first power control parameter(s) and/or second power control parameter(s) may be configured differently for the TX UE for each numerology. For example, the numerology may include at least one of subcarrier spacing and/or CP length. For example, first power control parameter(s) and/or second power control parameter(s) may be configured differently for the TX UE for each carrier. For example, first power control parameter(s) and/or second power control parameter(s) may be configured differently for the TX UE for each resource pool.

In step S1330, the TX UE may determine a (final) transmit power value. For example, the TX UE may determine the (final) transmit power value based on the first transmit power value and the second transmit power value. For example, the TX UE may determine the (final) transmit power value based on a minimum value among the first transmit power value and the second transmit power value. For example, the (final) transmit power value may be a transmit power value for PSCCH and/or PSSCH. For example, the TX UE may determine the (final) transmit power value based on Equation 5.

$$P=\min(PCMAX, PMAX\_CBR, \min(P\_DL, P\_SL)) \text{ [dBm]} \quad \text{[Equation 5]}$$

Herein, P may be a (final) transmit power value. For example, P_DL may be the first transmit power value. For example, P_SL may be the second transmit power value. For example, PCMAX may be a maximum transmit power value of the TX UE. For example, PMAX_CBR may be a value determined by a maximum SL transmit power value of the UE based on a priority level of PSSCH transmission and the CBR range including the CBR measured in one or more slots. For example, y=min (a, b) may be a function deriving a minimum value between a and b, and y=min (a, b, c) may be a function deriving a minimum value among a, b and c.

In step S1340, the TX UE may perform SL transmission to the RX UE based on the (final) transmission power value. For example, the TX UE may transmit a PSSCH and/or a PSCCH to the RX UE based on the (final) transmit power value.

Based on an embodiment of the present disclosure, in order to reduce interference of SL communication affecting UL communication, the TX UE within the communication coverage of the base station may set a (final) SL transmit power value of the TX UE to a minimum value between a transmit power value (i.e., first transmit power value) obtained by using the DL pathloss (and/or pre-configured DL OLPC parameter(s) (e.g., PO_DL, ALPHA_DL, PCMAX_DL)) and a transmit power value (i.e., second transmit power value) obtained by using the SL pathloss (and/or pre-configured SL OLPC parameter(s) (e.g., PO_SL, ALPHA_SL, PCMAX_SL)). For example, in order to reduce interference of SL communication affecting UL communication, the base station or the network may configure the TX UE, within the communication coverage of the base station or the network, to determine the SL transmit power value based on the minimum value between the first transmit power value and the second transmit power value, through pre-defined signaling. For example, the pre-defined signaling may be SIB or RRC signaling.

Figure 14:
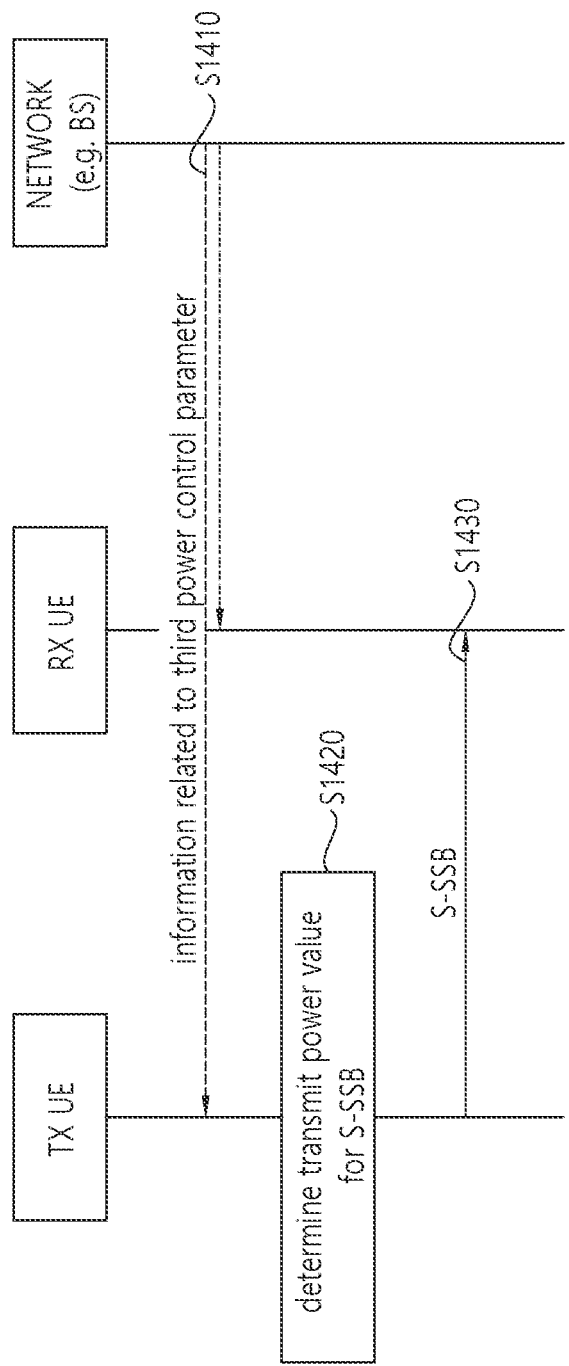
FIG. 14 shows a procedure for a UE to transmit a S-SSB based on power control, based on an embodiment of the present disclosure.

FIG. 14 shows a procedure for a UE to transmit a S-SSB based on power control, based on an embodiment of the present disclosure. The embodiment of FIG. 14 may be combined with various embodiments of the present disclosure.

For example, in the case of S-SSB transmission, a plurality of UEs may transmit the S-SSB together (or simultaneously) on the same resource. Accordingly, compared to interference of other SL channels/signals (e.g., PSCCH/PSSCH and/or PSFCH) affecting UL communication, interference of the S-SSB affecting UL communication may be relatively high. In consideration of this, parameter(s) described above may be configured or determined differently or independently between the S-SSB and other SL channels/signals (e.g., PSCCH/PSSCH and/or PSFCH). For example, the parameter(s) may be OLPC-related parameter(s). For example, the parameter(s) may be OLPC-related parameter(s) used by the UE to obtain/calculate P_DL and P_SL. For example, the parameter(s) may include at least one of a PO_DL value, an ALPHA_DL value, a PCMAX_DL value, a PO_SL value, an ALPHA_SL value, and/or a PCMAX_SL value.

Referring to FIG. 14, in step S1410, a network may transmit information related to third power control parameter(s). For example, the network may configure or pre-configure information related to third power control parameter(s) to one or more UEs within the coverage of the network. For example, information related to third power control parameter(s) and information related to first power control parameter(s) proposed in the embodiment of FIG. 13 may be configured independently for the UE. For example, information related to third power control parameter(s) and information related to first power control parameter(s) proposed in the embodiment of FIG. 13 may be configured differently for the UE. For example, when a plurality of UEs simultaneously transmit an S-SSB in the form of a single frequency network (SFN), the interference of the S-SSB transmission on UL communication may be relatively large compared to other SL transmissions. Accordingly, information related to third power control parameter(s) and information related to first power control parameter(s) proposed in the embodiment of FIG. 13 need to be independently configured for the UE. For example, the network may transmit information related to third power control parameter(s) to the TX UE. For example, the network may transmit information related to third power control parameter(s) to the RX UE. For example, the network may be a base station.

For example, information related to third power control parameter(s) may be information used by the TX UE to obtain a third transmit power value related to the DL pathloss. For example, the DL pathloss may be a pathloss between the TX UE and the base station. For example, third power control parameter(s) may include OLPC-related parameter(s). For example, third power control parameter(s) may include at least one of a PO_S-SSB value and/or an ALPHA_S-SSB value. For example, third power control parameter(s) may include at least one of a PO_S-SSB value, an ALPHA_S-SSB value, and/or a PCMAX_S-SSB value.

For example, the PO_S-SSB value may be a user-specific parameter related to an average of received SINRs. For example, the ALPHA_S-SSB value may be a weight value for the DL pathloss. For example, the PCMAX_S-SSB value may be a maximum transmit power value available or allowable for the TX UE when the TX UE performs S-SSB transmission to the RX UE. For example, the PO_S-SSB value may be referred to as a p0-S-SSB value. For example, the ALPHA_S-SSB value may be referred to as an alpha-S-SSB value. For example, the PCMAX_S-SSB value may be referred to as PCMAX.

In step S1420, the TX UE may obtain or determine the third transmit power value. For example, the third transmit power value may be referred to as a transmit power value for the S-SSB. For example, the TX UE may obtain the third transmit power value related to the DL pathloss by using information related to third power control parameter(s). For example, the TX UE may obtain the third transmit power value based on information related to third power control parameter(s) and the DL pathloss. For example, the TX UE may obtain the third transmit power value based on Equation 6.

$$P\_S\text{-}SSB = \min(PCMAX, PO\_S\text{-}SSB + 10 \log 10(2^u \cdot M\_RB) + ALPHA\_S\text{-}SSB \cdot PL\_DL)[dBm] \quad \text{[Equation 6]}$$

Herein, P_S-SSB may be the third transmit power value. For example, P_S-SSB may be a transmit power value for the S-SSB. For example, PCMAX may be a maximum transmit power value available or allowable for the TX UE. For example, PO_S-SSB may be a value for power control for the S-SSB based on the DL pathloss. For example, u may be a value related to SCS configuration. For example, M_RB may be the number of resource blocks for S-SSB transmission based on the SCS configuration. For example, M_RB may be 11. For example, ALPHA_S-SSB may be a value for power control for the S-SSB based on the DL pathloss. For example, if information related to third power control parameter(s) does not include ALPHA_S-SSB, the TX UE may determine that ALPHA_S-SSB is 1. For example, PL_DL may be a pathloss value between the TX UE and the base station. For example, y=min (a, b) may be a function deriving a minimum value between a and b.

In step S1430, the TX UE may transmit the S-SSB to the RX UE based on the third transmit power value.

Figure 15:
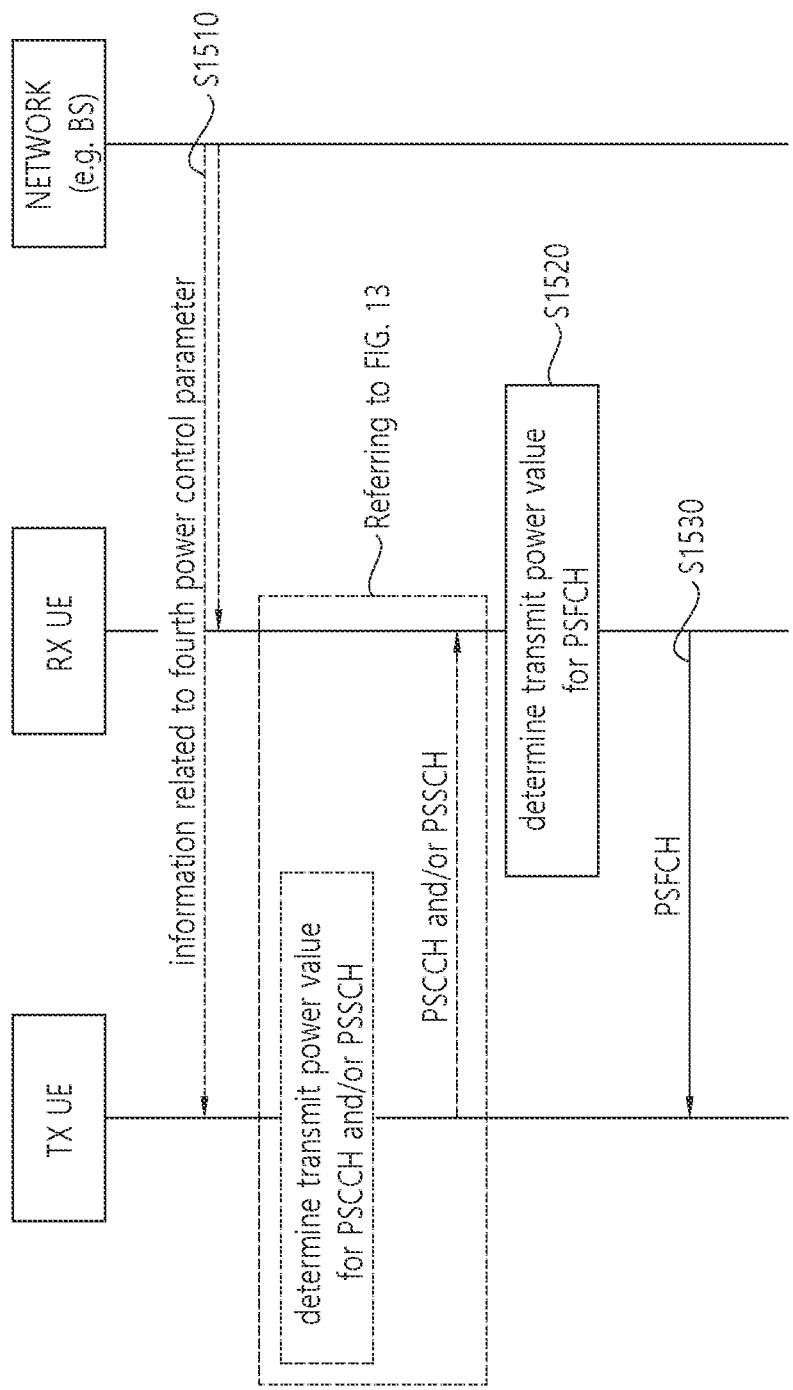
FIG. 15 shows a procedure in which a UE performs SL transmission based on power control, based on an embodiment of the present disclosure.

FIG. 15 shows a procedure in which a UE performs SL transmission based on power control, based on an embodiment of the present disclosure. The embodiment of FIG. 15 may be combined with various embodiments of the present disclosure.

Referring to FIG. 15, in step S1510, a network may transmit information related to fourth power control parameter(s). For example, the network may configure or pre-configure information related to fourth power control parameter(s) to one or more UEs within the coverage of the network. For example, information related to fourth power control parameter(s) may be configured for the UE independently of information related to first power control parameter(s), information related to second power control parameter(s), and/or information related to third power control parameter(s). For example, information related to fourth power control parameter(s) may be configured for the UE differently from information related to first power control parameter(s), information related to second power control parameter(s), and/or information related to third power control parameter(s). For example, the network may transmit information related to fourth power control parameter(s) to the TX UE. For example, the network may transmit information related to fourth power control parameter(s) to the RX UE. For example, the network may be a base station. Additionally, the network may transmit information related to first power control parameter(s) and information related to second power control parameter(s).

For example, information related to fourth power control parameter(s) may be information used by the RX UE to obtain a fourth transmit power value related to the DL pathloss. For example, the DL pathloss may be a pathloss between the RX UE and the base station. For example, fourth power control parameter(s) may include OLPC-related parameter(s). For example, fourth power control parameter(s) may include at least one of a PO_PSFCH value and/or an ALPHA_PSFCH value. For example, fourth power control parameter(s) may include at least one of a PO_PSFCH value, an ALPHA_PSFCH value, and/or a PCMAX_PSFCH value. For example, the PO_PSFCH value may be a user-specific parameter related to an average of received SINRs. For example, the ALPHA_PSFCH value may be a weight value for the DL pathloss. For example, the PCMAX_PSFCH value may be a maximum transmit power value available or allowable for the RX UE when the RX UE performs PSFCH transmission to the TX UE. For example, the PO_PSFCH value may be referred to as a p0-DL-PSFCH value or a dl-P0-PSFCH value. For example, the ALPHA_PSFCH value may be referred to as an alpha-DL-PSFCH value or a dl-Alpha-PSFCH value. For example, the PCMAX_PSFCH value may be referred to as PCMAX.

In the embodiment of FIG. 15, a procedure for the TX UE to determine a transmit power value for the PSCCH and/or the PSSCH and a procedure for the TX UE to transmit the PSCCH and/or the PSSCH may refer to FIG. 13.

In step S1520, the RX UE may determine to transmit the PSFCH. For example, the PSFCH may be related to the PSCCH and/or the PSSCH transmitted by a TX UE. For example, the RX UE may obtain or determine the fourth transmit power value. For example, the fourth transmit power value may be referred to as a transmit power value for the PSFCH. For example, the RX UE may obtain the fourth transmit power value related to the DL pathloss, by using information related to fourth power control parameter(s). For example, the RX UE may obtain the fourth transmit power value based on information related to fourth power control parameter(s) and the DL pathloss. For example, the RX UE may obtain the fourth transmit power value based on Equation 7.

$$P\_PSFCH = \min(PCMAX, PO\_PSFCH + 10 \log 10(2^u) + ALPHA\_PSFCH \cdot PL\_DL)[dBm] \quad \text{[Equation 7]}$$

Herein, P_PSFCH may be the fourth transmit power value. For example, P_PSFCH may be a transmit power value for the PSFCH. For example, PCMAX may be a maximum transmit power value of the RX UE. For example, PO_PSFCH may be a value for power control based on the DL pathloss for the PSFCH. For example, u may be a value related to SCS configuration. For example, ALPHA_PSFCH may be a value for power control based on the DL pathloss for the PSFCH. For example, if information related to fourth power control parameter(s) does not include ALPHA_PSFCH, the TX UE may determine that ALPHA_PSFCH is 1. For example, PL_DL may be a pathloss value between the RX UE and the base station. For example, y=min (a, b) may be a function deriving a minimum value among a and b.

In step S1530, the RX UE may transmit the PSFCH to the TX UE based on the fourth transmit power value.

Based on an embodiment of the present disclosure, the TX UE within the communication coverage of the base station may receive at least one information related to transmit power from the base station or the network. For example, the at least one information related to transmit power may include first information and second information. Additionally/Alternatively, based on the received at least one information related to transmit power, the TX UE may calculate or obtain a first value and a second value related to the transmit power for performing sidelink communication with the RX UE. For example, the first value may be obtained by calculating or deriving based on the first information, and the second value may be obtained by calculating or deriving based on the second information. For example, the first value may be a SL transmit power value obtained by using the DL pathloss between the base station and the TX UE. For example, the second value may be a SL transmit power value obtained by using the SL pathloss between the TX UE and the RX UE. In addition, the TX UE may determine transmit power based on the first value and the second value. For example, the transmit power may be a minimum value among the first value and the second value. Also, the first information and the second information may be one of information described in various embodiments of the present disclosure. In addition, the TX UE may perform transmission to the RX UE based on the determined transmit power.

Figure 16:
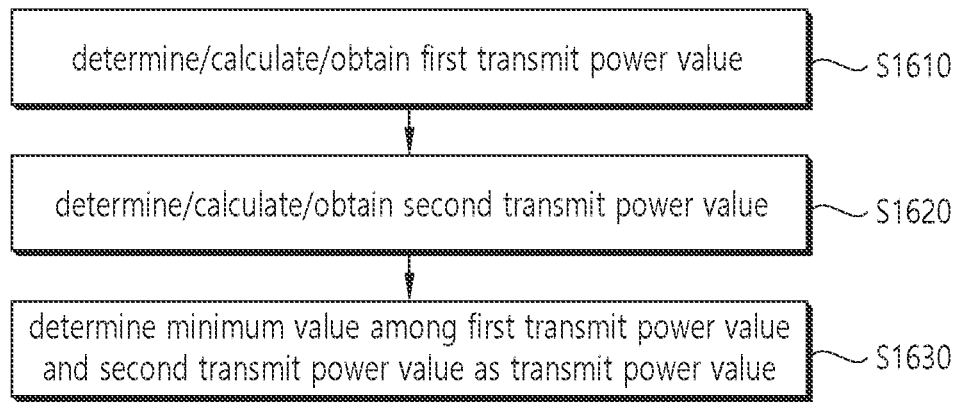
FIG. 16 shows a method for a first device to perform wireless communication, based on an embodiment of the present disclosure.

FIG. 16 shows a method for a first device to determine transmit power, based on an embodiment of the present disclosure. The embodiment of FIG. 16 may be combined with various embodiments of the present disclosure.

Figure 17:
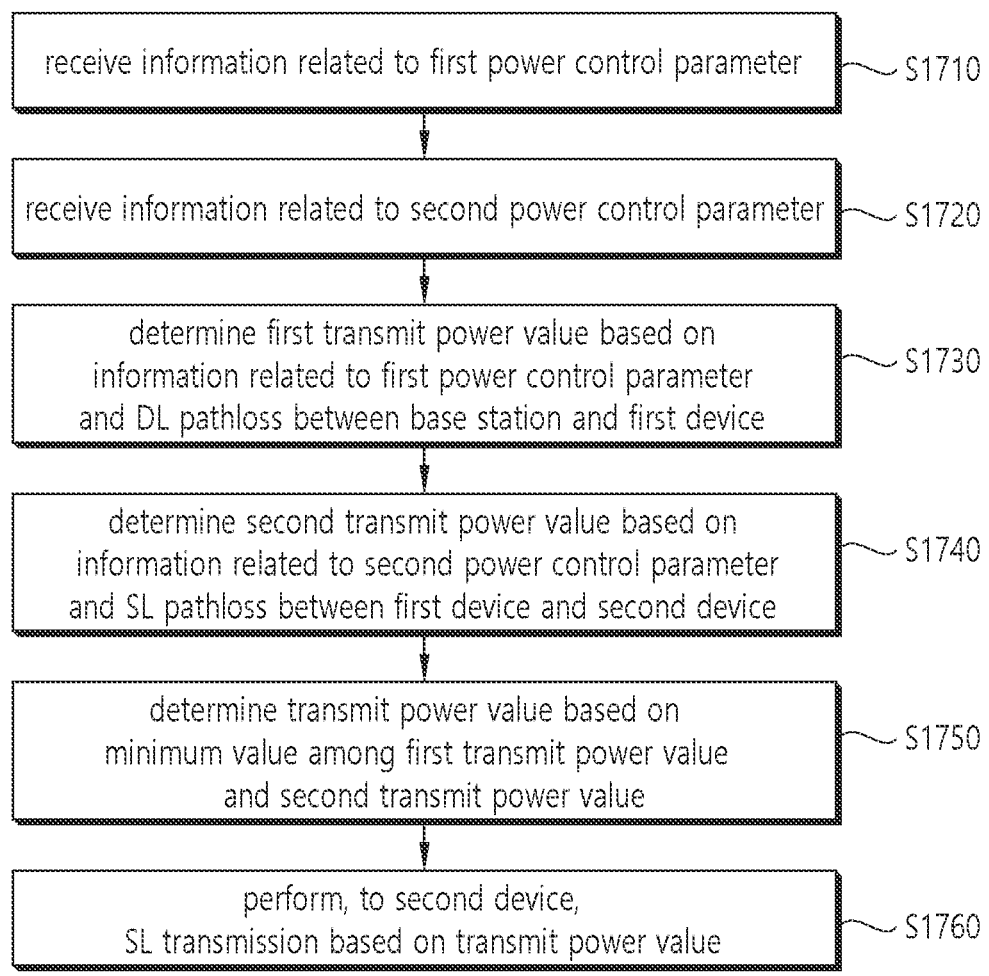
FIG. 17 shows a method for a first device to perform wireless communication, based on an embodiment of the present disclosure.

Referring to FIG. 17, in step S1610, the first device (100) may determine/calculate/obtain a first transmit power value. For example, the first transmit power value may be determined/calculated/obtained based on the DL pathloss between the base station and the first device (100). For example, based on various embodiments of the present disclosure, the first device (100) may determine/calculate/obtain the first transmit power value based on the DL pathloss between the base station and the first device (100).

In step S1620, the first device (100) may determine/calculate/obtain a second transmit power value. For example, the second transmit power value may be determined/calculated/obtained based on the SL pathloss between the first device (100) and the second device (200). For example, based on various embodiments of the present disclosure, the first device (100) may determine/calculate/obtain the second transmit power value based on the SL pathloss between the first device (100) and the second device (200).

In step S1630, the first device (100) may determine a minimum value among the first transmit power value and the second transmit power value as a transmit power value. In addition, for example, the first device (100) may perform sidelink transmission based on the transmit power value.

FIG. 17 shows a method for a first device to perform wireless communication, based on an embodiment of the present disclosure. The embodiment of FIG. 17 may be combined with various embodiments of the present disclosure.

Referring to FIG. 17, in step S1710, a first device may receive information related to a first power control parameter.

In step S1720, the first device may receive information related to a second power control parameter.

In step S1730, the first device may determine a first transmit power value based on the information related to the first power control parameter and a downlink (DL) pathloss between a base station and the first device.

In step S1740, the first device may determine a second transmit power value based on the information related to the second power control parameter and a sidelink (SL) pathloss between the first device and a second device.

In step S1750, the first device may determine a transmit power value based on a minimum value among the first transmit power value and the second transmit power value.

In step S1760, the first device may perform, to the second device, SL transmission based on the transmit power value.

For example, the information related to the first power control parameter and the information related to the second power control parameter may be configured independently for the first device.

For example, the information related to the first power control parameter may include at least one of a first P0 value for power control related to the SL transmission based on the DL pathloss, or a first alpha value for power control related to the SL transmission based on the DL pathloss. For example, the first P0 value may be a power control parameter applied by the first device to control an average interference level that transmission of a SL channel by the first device affects UL communication related to the base station. For example, the first alpha value may be a power control parameter applied by the first device to maintain an interference level that transmission of the SL channel by the first device affects UL communication related to the base station, regardless of a change in a distance between the first device and the base station.

For example, the information related to the second power control parameter may include at least one of a second P0 value for power control related to the SL transmission based on the SL pathloss, or a second alpha value for power control related to the SL transmission based on the SL pathloss. For example, the second P0 value may be a power control parameter applied by the first device to ensure that the second device receive a SL channel transmitted by the first device with a required minimum average reliability or higher. For example, the second alpha value may be a power control parameter applied by the first device to maintain reception power and reliability of the second device for the SL channel transmitted by the first device, regardless of a change in a distance between the first device and the second device.

For example, the transmit power value may be determined to be a smaller value among a maximum transmit power value allowed for the first device and the minimum value.

For example, the first power control parameter and the second power control parameter may be configured differently for the first device, based on at least one of a congestion level, SL quality, a type of service, a priority of a service, a quality of service (QoS) parameter related to a service, a cast type, a numerology, a carrier, or a resource pool.

Additionally, for example, the first device may receive, from the base station, information related to the maximum transmit power value. For example, the maximum transmit power value may be configured differently for the first device, based on at least one of a congestion level, SL quality, a type of a service, a priority of a service, a QoS parameter related to a service, a cast type, a numerology, a carrier, or a resource pool.

Additionally, for example, the first device may receive information related to a third power control parameter. Additionally, for example, the first device may determine a third transmit power value based on the third power control parameter and the DL pathloss between the base station and the first device. Additionally, for example, the first device may transmit, to the second device, a sidelink synchronization signal block (S-SSB) based on the third transmit power value. For example, the information related to the third power control parameter may include at least one of a third P0 value for power control related to the S-SSB based on the DL pathloss or a third alpha value for power control related to the S-SSB based on the DL pathloss. For example, the information related to the first power control parameter and the information related to the third power control parameter may be configured independently for the first device. For example, the first power control parameter may be a parameter applied for power control of at least one of a physical sidelink control channel (PSCCH), a physical sidelink shared channel (PSSCH), or a physical sidelink feedback channel (PSFCH).

For example, in the present disclosure, an (average or maximum or minimum) (allowed) interference level in which SL transmission (e.g., PSCCH, PSSCH, PSFCH, S-SSB) affects UL communication may be configured to a level similar to an (average or maximum or minimum) UL power level received by the base station during UL transmission (e.g., PUSCH, PUCCH) by the TX UE.

The proposed method can be applied to device(s) described below. First, the processor (102) of the first device (100) may control the transceiver (106) to receive information related to a first power control parameter. In addition, the processor (102) of the first device (100) may control the transceiver (106) to receive information related to a second power control parameter. In addition, the processor (102) of the first device (100) may determine a first transmit power value based on the information related to the first power control parameter and a downlink (DL) pathloss between a base station and the first device. In addition, the processor (102) of the first device (100) may determine a second transmit power value based on the information related to the second power control parameter and a sidelink (SL) pathloss between the first device and a second device. In addition, the processor (102) of the first device (100) may determine a transmit power value based on a minimum value among the first transmit power value and the second transmit power value. In addition, the processor (102) of the first device (100) may control the transceiver (106) to perform, to the second device, SL transmission based on the transmit power value.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive information related to a first power control parameter; receive information related to a second power control parameter; determine a first transmit power value based on the information related to the first power control parameter and a downlink (DL) pathloss between a base station and the first device; determine a second transmit power value based on the information related to the second power control parameter and a sidelink (SL) pathloss between the first device and a second device; determine a transmit power value based on a minimum value among the first transmit power value and the second transmit power value; and perform, to the second device, SL transmission based on the transmit power value.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive information related to a first power control parameter; receive information related to a second power control parameter; determine a first transmit power value based on the information related to the first power control parameter and a downlink (DL) pathloss between a base station and the first UE; determine a second transmit power value based on the information related to the second power control parameter and a sidelink (SL) pathloss between the first UE and a second UE; determine a transmit power value based on a minimum value among the first transmit power value and the second transmit power value; and perform, to the second UE, SL transmission based on the transmit power value.

Based on an embodiment of the present disclosure, a non-transitory computer-readable storage medium storing instructions may be provided. For example, the instructions, when executed, may cause a first device to: receive information related to a first power control parameter; receive information related to a second power control parameter; determine a first transmit power value based on the information related to the first power control parameter and a downlink (DL) pathloss between a base station and the first device; determine a second transmit power value based on the information related to the second power control parameter and a sidelink (SL) pathloss between the first device and a second device; determine a transmit power value based on a minimum value among the first transmit power value and the second transmit power value; and perform, to the second device, SL transmission based on the transmit power value.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
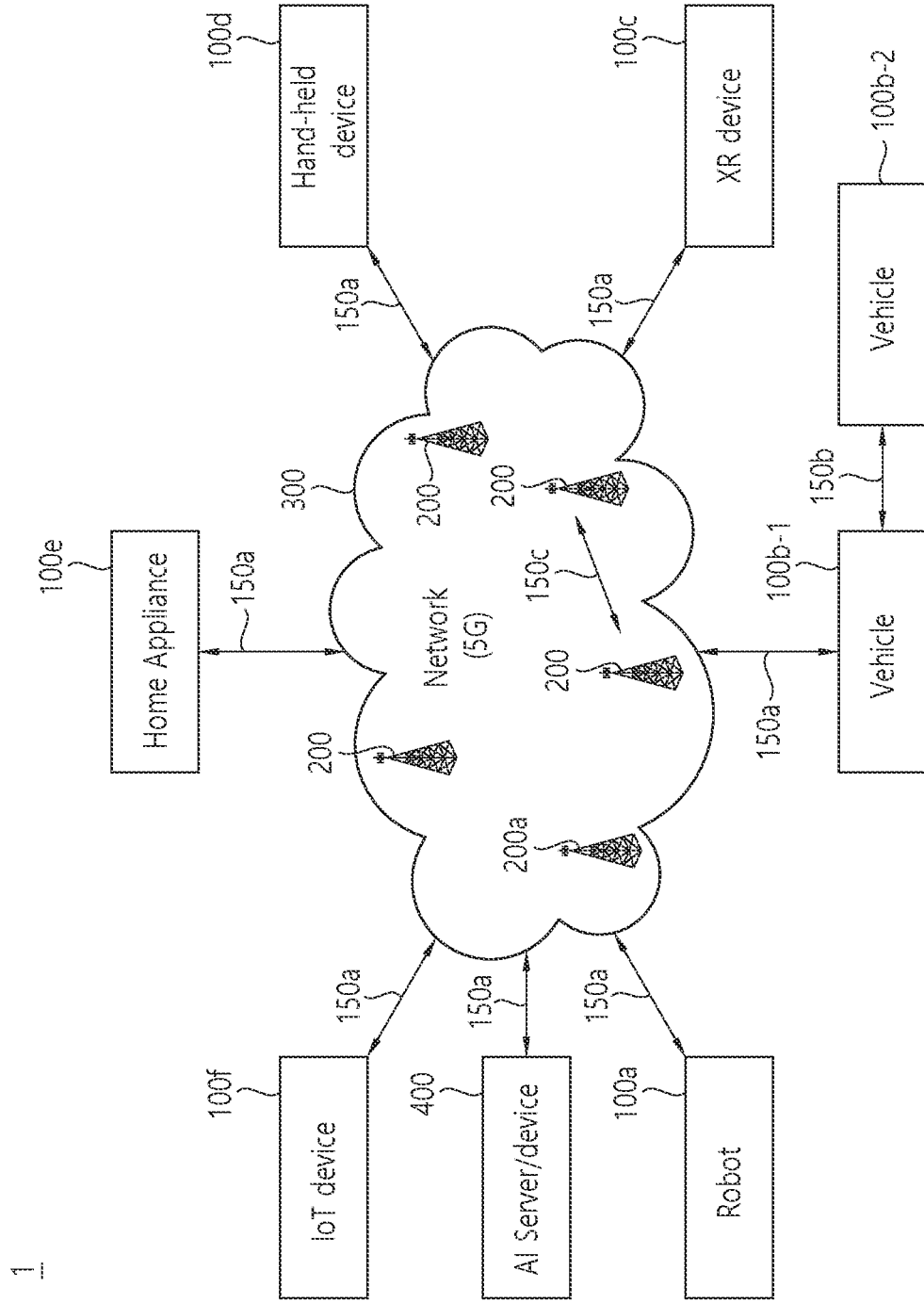
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
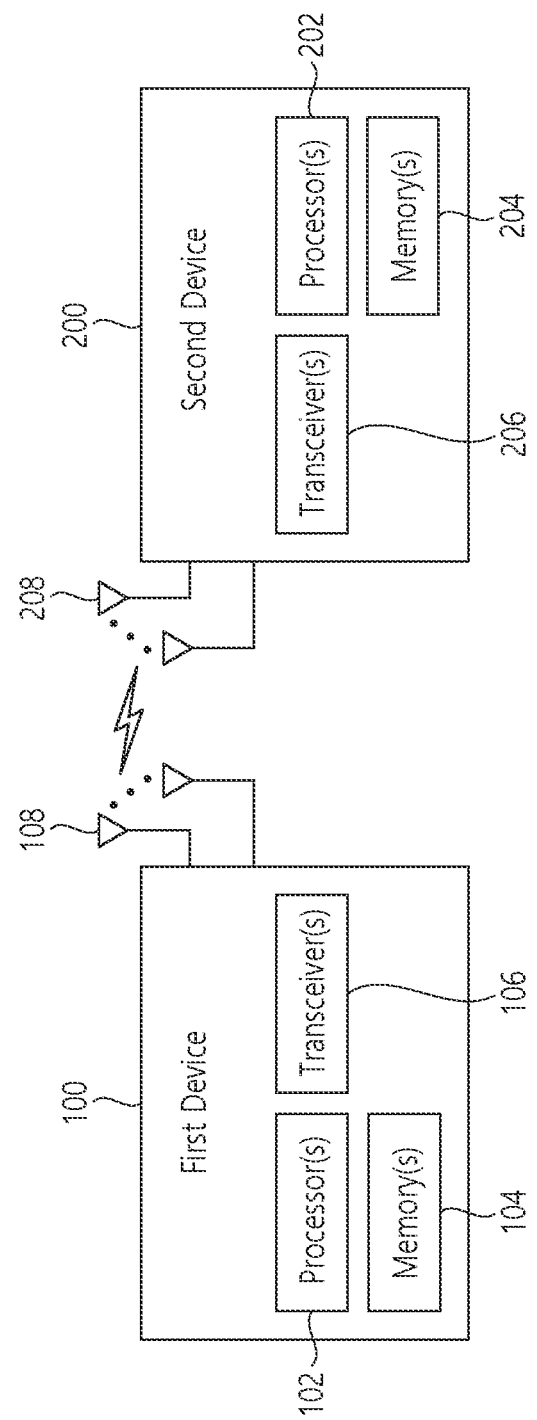
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
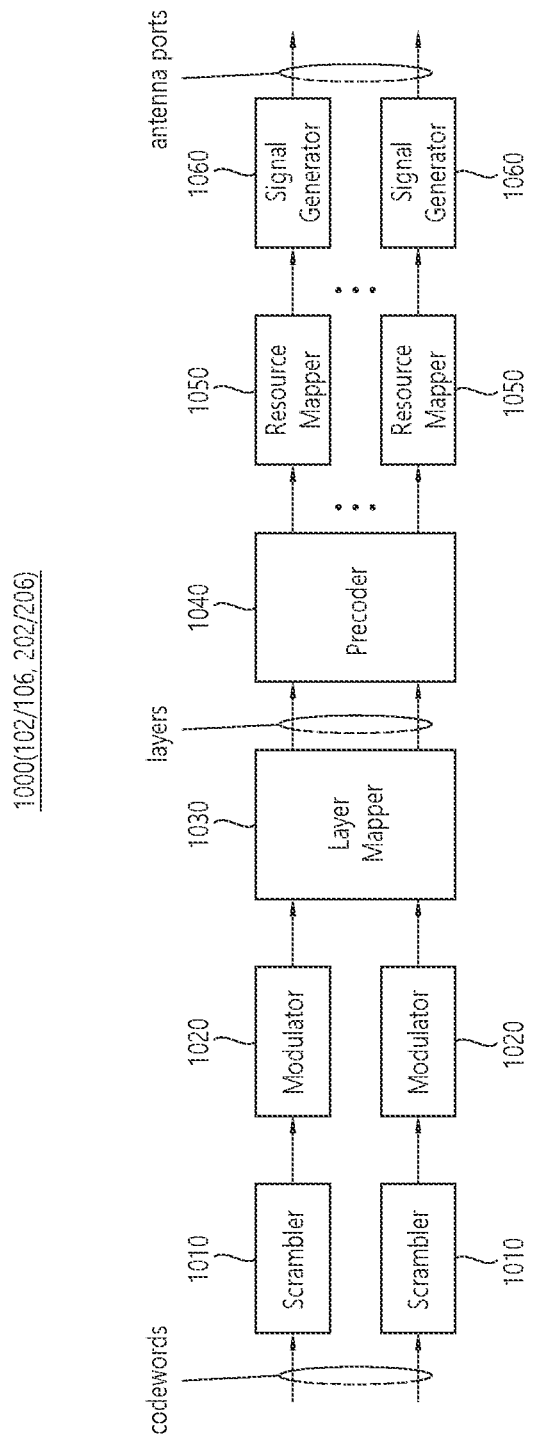
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
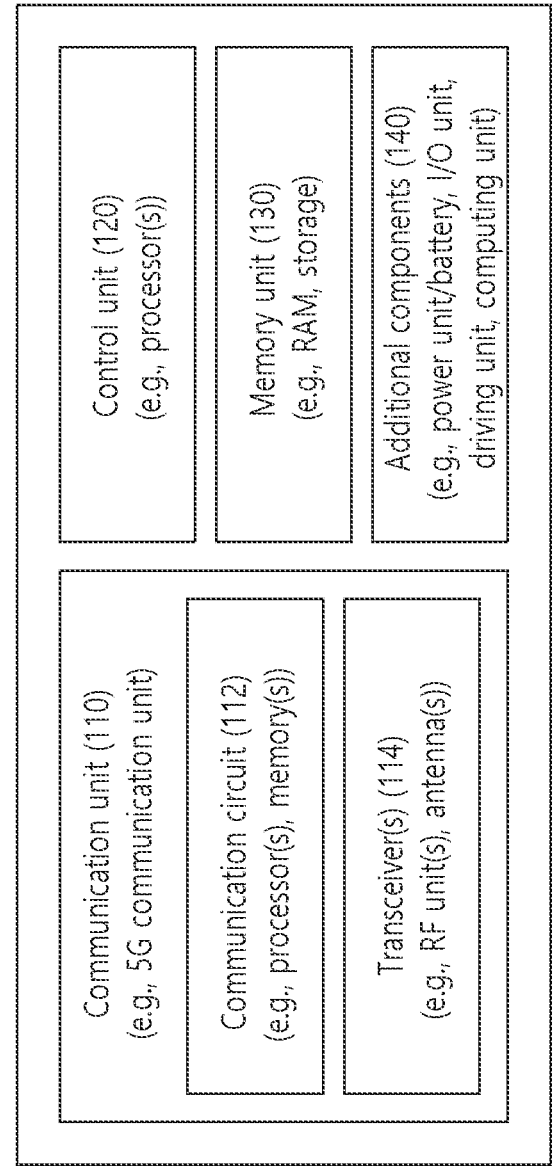
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
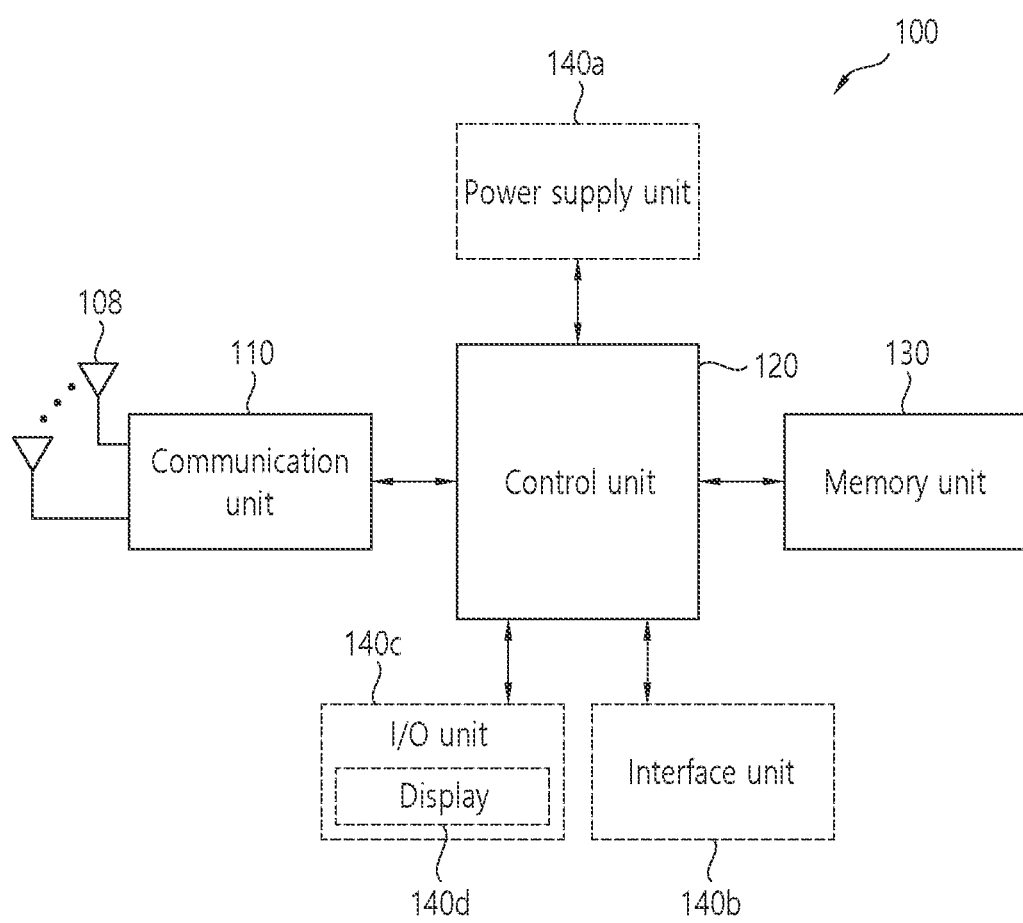
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
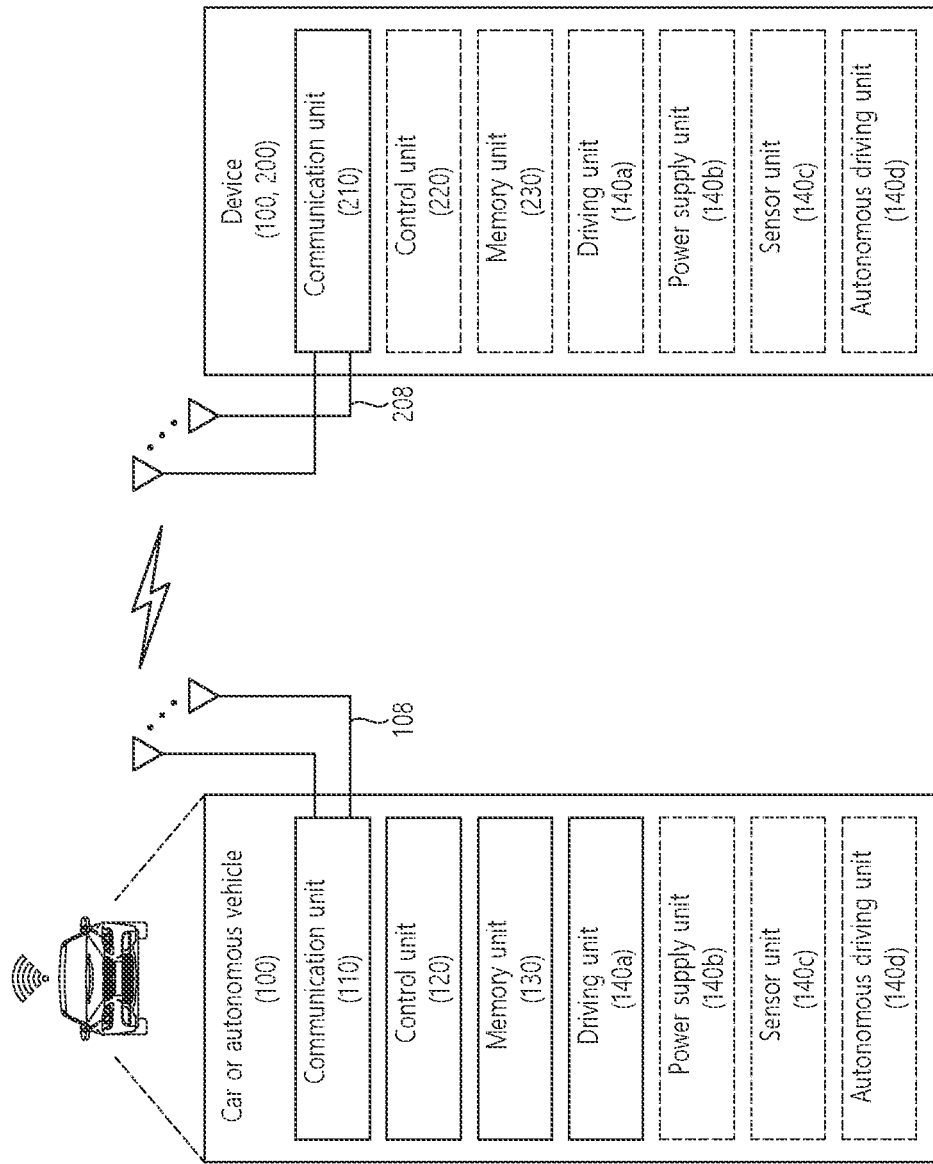
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:
    obtaining information related to a first downlink (DL) P0 value for a physical sidelink control channel (PSCCH) or a physical sidelink shared channel (PSSCH) for a DL pathloss and a first DL alpha value for the PSCCH or the PSSCH for the DL pathloss;
    obtaining information related to a sidelink (SL) P0 value for the PSCCH or the PSSCH for a SL pathloss and a SL alpha value for the PSCCH or the PSSCH for the SL pathloss;
    obtaining information related to a second DL P0 value for a physical sidelink feedback channel (PSFCH) for the DL pathloss and a second DL alpha value for the PSFCH for the DL pathloss;
    determining a first transmit power value based on a minimum value between a DL value, which is related to the DL pathloss, the first DL P0 value for the PSCCH or the PSSCH, and the first DL alpha value for the PSCCH or the PSSCH and a SL value, which is related to the SL pathloss, the SL P0 value for the PSCCH or the PSSCH, and the SL alpha value for the PSCCH or the PSSCH;
    determining a second transmit power value based on the DL pathloss, the second DL P0 value for the PSFCH, and the second DL alpha value for the PSFCH;
    transmitting the PSCCH or the PSSCH based on the first transmit power value; and transmitting the PSFCH based on the second transmit power value.

2. The method of claim 1,
wherein the first DL P0 value for the PSCCH or the PSSCH, the first DL alpha value for the PSCCH or the PSSCH, the SL P0 value for the PSCCH or the PSSCH, and the SL alpha value for the PSCCH or the PSSCH, the second DL P0 for the PSFCH, and the second DL alpha value for the PSFCH are configured independently.

3. The method of claim 1,
wherein the first transmit power value is determined based on the minimum value between the DL value obtained based on adding the first DL P0 value for the PSCCH or the PSSCH and a product of the DL pathloss and the first DL alpha value for the PSCCH or the PSSCH, and the SL value is obtained based on adding the SL P0 value for the PSCCH or the PSSCH and a product of the SL pathloss and the SL alpha value for the PSCCH or the PSSCH.

4. The method of claim 3,
wherein the DL pathloss is related to a communication with a base station, and
wherein the SL pathloss is related to a communication with second device.

5. The method of claim 1, further comprising:
obtaining synchronization related to SL communication from a synchronization reference;
obtaining information related to a third DL P0 value for a physical sidelink broadcast channel (PSBCH) for the DL pathloss and a third DL alpha value for the PSCCH or the PSSCH for the DL pathloss;
determining a third transmit power value based on the DL pathloss, the third DL P0 value for the PSBCH, and the third DL alpha value for the PSBCH; and
transmitting a sidelink-synchronization signal block/PSBCH (S-SS/PSBCH) based on the third transmit power value and the synchronization.

6. The method of claim 5,
wherein the third DL P0 value for the PSBCH and the third DL alpha value for the PSBCH are related to the S-SS/PSBCH.

7. The method of claim 5,
wherein the third DL P0 value for the PSBCH is a power control parameter to control an average interference level that transmission of the S-SS/PSBCH affects uplink (UL) communication related to a base station, and
wherein the third DL alpha value for the PSBCH is a power control parameter to maintain an interference level that the transmission of the S-SS/PSBCH affects the UL communication related to the base station, regardless of a change in a distance to the base station.

8. The method of claim 5,
wherein the DL pathloss, the first DL P0 value for the PSCCH or the PSSCH, the first DL alpha value for the PSCCH or the PSSCH, the SL pathloss, the SL P0 value for the PSCCH or the PSSCH, and the SL alpha value for the PSCCH or the PSSCH are parameters for power control of the PSCCH or the PSSCH, and
wherein the DL pathloss, the second DL P0 value for the PSFCH, and the second DL alpha value for the PSFCH are parameters for power control of the PSFCH.

9. The method of claim 5,
wherein the S-SS/PSBCH block includes a sidelink-primary synchronization signal (S-PSS), a sidelink-secondary synchronization signal (S-SSS), and the PSBCH.

10. The method of claim 5,
wherein the third transmit power value is determined based on a value obtained based on adding the third DL P0 value for the PSBCH and a product of the DL pathloss and the third DL alpha value for the PSBCH.

11. The method of claim 5,
wherein the first DL P0 value for the PSCCH or the PSSCH, the first DL alpha value for the PSCCH or the PSSCH, the third DL P0 value for the PSBCH, the third DL alpha value for the PSBCH, the SL P0 value for the PSCCH or the PSSCH, and the SL alpha value for the PSCCH or the PSSCH are pre-configured or configured by a radio resource control (RRC) signaling, a system information block (SIB), or a base station.

12. The method of claim 5,
wherein the first DL P0 value for the PSCCH or the PSSCH, the first DL alpha value for the PSCCH or the PSSCH, the third DL P0 value for the PSBCH, the third DL alpha value for the PSBCH, the SL P0 value for the PSCCH or the PSSCH, and the SL alpha value for the PSCCH or the PSSCH is configured independently.

13. The method of claim 5,
wherein the DL pathloss, the third DL P0 value for the PSBCH, the third DL alpha value for the PSBCH are parameters for power control of the PSBCH.

14. The method of claim 1,
wherein the SL P0 value for the PSCCH or the PSSCH is a power control parameter to ensure that a second device receives a SL channel with a required minimum average reliability or higher, and
wherein the SL alpha value for the PSCCH or the PSSCH is a power control parameter to maintain reception power and reliability of the second device for the SL channel, regardless of a change in a distance to the second device.

15. The method of claim 1, further comprising:
obtaining information related to a maximum transmit power value,
wherein the first transmit power value is determined to be a smaller value between the maximum transmit power value allowed and the minimum value.

16. The method of claim 1,
wherein the second transmit power value is determined based on a value obtained based on adding the second DL P0 value for the PSFCH and a product of the DL pathloss and the second DL alpha value for the PSFCH.

17. The method of claim 1,
wherein the PSFCH is transmitted based on a reception of a PSSCH that is different from the PSSCH.

18. The method of claim 1,
wherein the method is performed by a first device.

19. A first device comprising:
at least one transceiver;
at least one processor; and
at least one memory connected to the at least one processor and storing instructions that, based on being executed by the at least one processor, cause the at least one processor to perform operations comprising:
obtaining information related to a first downlink (DL) P0 value for a physical sidelink control channel (PSCCH) or a physical sidelink shared channel (PSSCH) for a DL pathloss and a first DL alpha value for the PSCCH or the PSSCH for the DL pathloss;

obtaining information related to a sidelink (SL) P0 value for the PSCCH or the PSSCH for a SL pathloss and a SL alpha value for the PSCCH or the PSSCH for the SL pathloss;

obtaining information related to a second DL P0 value for a physical sidelink feedback channel (PSFCH) for the DL pathloss and a second DL alpha value for the PSFCH for the DL pathloss;

determining a first transmit power value based on a minimum value between a DL value, which is related to the DL pathloss, the first DL P0 value for the PSCCH or the PSSCH, and the first DL alpha value for the PSCCH or the PSSCH and a SL value, which is related to the SL pathloss, the SL P0 value for the PSCCH or the PSSCH, and the SL alpha value for the PSCCH or the PSSCH;

determining a second transmit power value based on the DL pathloss, the second DL P0 value for the PSFCH, and the second DL alpha value for the PSFCH;

transmitting the PSCCH or the PSSCH based on the first transmit power value; and transmitting the PSFCH based on the second transmit power value.

20. A processing device comprising:

at least one processor; and at least one memory connected to the at least one processor and storing instructions that, based on being executed by the at least one processor, cause the processing device to perform operations comprising:

obtaining information related to a first downlink (DL) P0 value for a physical sidelink control channel (PSCCH) or a physical sidelink shared channel (PSSCH) for a DL pathloss and a first DL alpha value for the PSCCH or the PSSCH for the DL pathloss;

obtaining information related to a sidelink (SL) P0 value for the PSCCH or the PSSCH for a SL pathloss and a SL alpha value for the PSCCH or the PSSCH for the SL pathloss;

obtaining information related to a second DL P0 value for a physical sidelink feedback channel (PSFCH) for the DL pathloss and a second DL alpha value for the PSFCH for the DL pathloss;

determining a first transmit power value based on a minimum value between a DL value, which is related to the DL pathloss, the first DL P0 value for the PSCCH or the PSSCH, and the first DL alpha value for the PSCCH or the PSSCH and a SL value, which is related to the SL pathloss, the SL P0 value for the PSCCH or the PSSCH, and the SL alpha value for the PSCCH or the PSSCH;

determining a second transmit power value based on the DL pathloss, the second DL P0 value for the PSFCH, and the second DL alpha value for the PSFCH;

transmitting the PSCCH or the PSSCH based on the first transmit power value; and transmitting the PSFCH based on the second transmit power value.

* * * * *